(12) United States Patent
Zhou

(10) Patent No.: US 9,404,522 B2
(45) Date of Patent: Aug. 2, 2016

(54) AUXILIARY WHEEL, UNASSISTED LIFTING JACK AND APPARATUS FOR UNLOCKING AND LOCKING SELF-LOCKING DEVICE OF AUXILIARY WHEEL

(76) Inventor: Lixin Zhou, Handan (CN)

( * ) Notice: Subject to any disclaimer, the term of this patent is extended or adjusted under 35 U.S.C. 154(b) by 315 days.

(21) Appl. No.: 13/978,639

(22) PCT Filed: Jan. 4, 2012

(86) PCT No.: PCT/CN2012/070021
§ 371 (c)(1),
(2), (4) Date: Jul. 26, 2013

(87) PCT Pub. No.: WO2012/092852
PCT Pub. Date: Jul. 12, 2012

(65) Prior Publication Data
US 2013/0300184 A1    Nov. 14, 2013

(30) Foreign Application Priority Data

Jan. 6, 2011 (CN) .......................... 2011 1 0020106
Jan. 6, 2011 (CN) ...................... 2011 2 0017247 U
Jan. 6, 2011 (CN) ...................... 2011 2 0017252 U
May 31, 2011 (CN) .......................... 2011 1 0143416
May 31, 2011 (CN) .......................... 2011 1 0143418

(51) Int. Cl.
B60C 27/00      (2006.01)
F16B 21/07      (2006.01)
(Continued)

(52) U.S. Cl.
CPC ............... *F16B 21/073* (2013.01); *B25B 27/00* (2013.01); *B25B 31/00* (2013.01); *B60B 11/10* (2013.01);
(Continued)

(58) Field of Classification Search
CPC ...... B60B 15/26; B60B 15/263; B60B 15/266
USPC .................................. 301/40.2; 152/216, 219
See application file for complete search history.

(56) References Cited

U.S. PATENT DOCUMENTS 1,904,081 A    4/1933  Pratt
2,031,257 A *  2/1936  Finke, Jr. ................ B60B 11/10
                                                          301/40.2
(Continued)

FOREIGN PATENT DOCUMENTS

CN         2056379 U     4/1990
CN         1365902 A     4/1993
(Continued)

OTHER PUBLICATIONS

International Search Report prepared by the State Intellectual Propperty Office of the P.R. China on Apr. 12, 2012, for International Application No. PCT/CN2012/070021.

*Primary Examiner* — Jeffrey J Restifo
(74) *Attorney, Agent, or Firm* — Sheridan Ross P.C.

(57) ABSTRACT

Disclosed is an auxiliary wheel comprising a wheel hub and a tire. The auxiliary wheel is fixedly mounted on a wheel of an automotive vehicle in a manner that the auxiliary wheel and the wheel have a common rotary axis. The auxiliary wheel may further comprise one or more locking components located on the wheel hub, and the locking component is used to fix the auxiliary wheel on the wheel hub of the wheel, so that the auxiliary wheel is driven by the wheel hub of the wheel. The present invention further relates to an unassisted lifting jack used when the auxiliary wheel is mounted. The unassisted lifting jack comprises a climbing block and a supporting block connected in a rotary way, the climbing block and the supporting block have a common supporting bottom, and the climbing block has a slope provided to the auxiliary wheel for climbing.

19 Claims, 16 Drawing Sheets

(51) Int. Cl.
*B25B 27/00* (2006.01)
*B25B 31/00* (2006.01)
*B60C 17/01* (2006.01)
*B60B 23/04* (2006.01)
*B60B 23/10* (2006.01)
*B60B 25/20* (2006.01)
*B66F 7/24* (2006.01)
*B60B 11/10* (2006.01)
*B60B 29/00* (2006.01)

(52) U.S. Cl.
CPC ............... *B60B 23/04* (2013.01); *B60B 23/10* (2013.01); *B60B 25/20* (2013.01); *B60B 29/003* (2013.01); *B60C 17/01* (2013.01); *B66F 7/243* (2013.01)

(56) References Cited

U.S. PATENT DOCUMENTS

| | | | | | |
|---|---|---|---|---|---|
| 2,174,944 | A | * | 10/1939 | Leggett | B60B 15/16 301/40.2 |
| 2,924,486 | A | * | 2/1960 | Blaschke | B60B 15/26 301/48 |
| 3,206,253 | A | * | 9/1965 | Bedan | B60B 15/26 301/44.1 |
| 3,458,236 | A | * | 7/1969 | Winsen | B60B 15/26 301/47 |
| 3,464,475 | A | * | 9/1969 | Freed | B60B 11/10 152/167 |
| 3,935,891 | A | * | 2/1976 | McCloud | B60C 27/04 152/220 |
| 4,386,643 | A | * | 6/1983 | Belknap, III | B60C 27/04 152/216 |
| 4,387,930 | A | * | 6/1983 | Hunt | B60B 15/26 15/21 |
| 4,666,216 | A | * | 5/1987 | Smith | B60B 11/10 301/39.1 |
| 4,818,031 | A | * | 4/1989 | Brown | B60B 11/02 301/111.04 |
| 4,883,104 | A | * | 11/1989 | Minami | B60C 11/1606 152/210 |
| 4,906,051 | A | * | 3/1990 | Vilhauer, Jr. | B60B 15/26 301/38.1 |
| 4,929,032 | A | * | 5/1990 | Isaacson | B60B 11/10 301/38.1 |
| 5,407,255 | A | * | 4/1995 | Feldman | B60B 11/10 301/38.1 |
| 5,716,106 | A | * | 2/1998 | Warner | B60B 15/26 301/40.1 |
| 5,788,335 | A | * | 8/1998 | O'Brien | B60B 15/26 301/40.6 |
| 5,906,418 | A | * | 5/1999 | Cullen | B60B 11/06 301/35.628 |
| 6,022,082 | A | * | 2/2000 | O'Brien | B60B 15/26 152/216 |
| 6,062,651 | A | * | 5/2000 | Schaad | B60B 11/02 301/40.2 |
| 6,217,125 | B1 | * | 4/2001 | Tubetto | B60B 11/10 301/40.2 |
| 7,077,065 | B2 | * | 7/2006 | Tremblay | B60B 11/02 105/72.2 |
| 8,251,458 | B2 | * | 8/2012 | Biesse | B60B 15/263 301/39.1 |
| 2009/0015058 | A1 | * | 1/2009 | Biesse | B60B 19/04 301/40.2 |

FOREIGN PATENT DOCUMENTS

| | | |
|---|---|---|
| CN | 2481541 Y | 3/2002 |
| CN | 1789022 A | 6/2006 |
| CN | 2799294 Y | 6/2006 |
| GB | 2184071 A | 6/1987 |
| JP | 63-82807 A | 4/1988 |

* cited by examiner

A-A

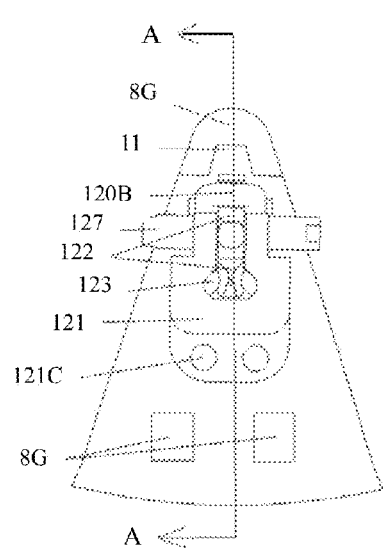
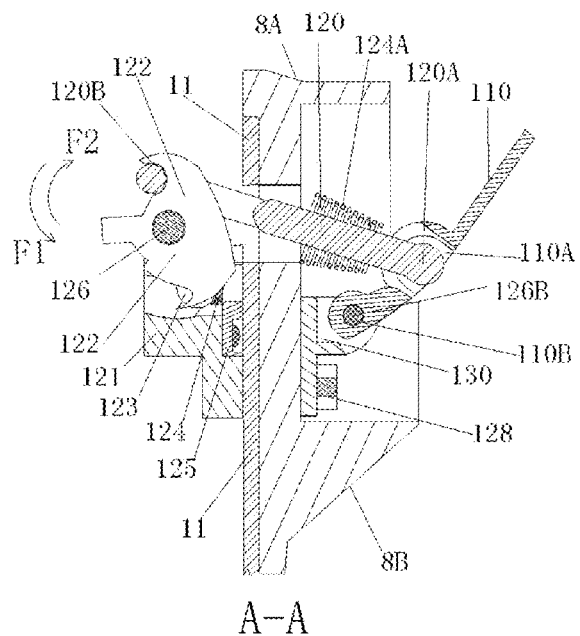
Figure 6A
Figure 6B
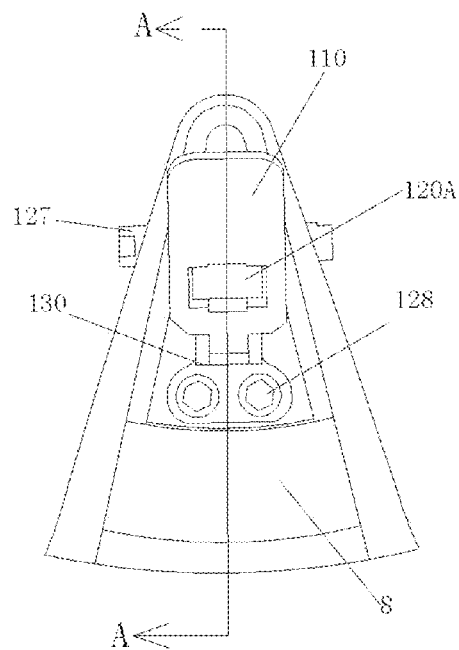
Figure 6C

AUXILIARY WHEEL, UNASSISTED LIFTING JACK AND APPARATUS FOR UNLOCKING AND LOCKING SELF-LOCKING DEVICE OF AUXILIARY WHEEL

CROSS REFERENCE TO RELATED APPLICATIONS

This application is a national stage application under 35 U.S.C. 371 and claims the benefit of PCT Application No. PCT/CN2012/070021 having an international filing date of Jan. 4, 2012, which designated the United States, and which PCT application claimed the benefit of Chinese Patent Application 201110020106.4 filed Jan. 6, 2011; Chinese Utility Model Application No. 201120017252.7 filed Jan. 6, 2011; Chinese Utility Model Application No. 201120017247.6 filed Jan. 6, 2011; Chinese Patent Application No. 201110143418.4 filed May 31, 2011; and Chinese Patent Application No. 201110143416.5 filed May 31, 2011, the disclosures of which are incorporated herein by reference.

FIELD OF THE INVENTION

The invention relates to an auxiliary wheel and an unassisted lifting jack for mounting and demounting the auxiliary wheel.

BACKGROUND OF THE INVENTION

An accident may happen to a travelling vehicle due to, e.g., a gas leakage of a tyre, bad weather, etc. A general measure taken for the existing tyre experiencing the accident may include: replacing the failed tyre with a good tyre, using tyres dedicated for the bad weather, or temporarily processing the tyre. To alleviate the damage caused by tyre burst, for example, special purpose tyres with an internal supporting structure may be adopted to allow the vehicle to travel safely a certain distance after the tyre burst. In the case of traveling on a slippery road, tyres with anti-slip spikes may be used. Again, in the case of traveling on a road with snow, anti-slip chains may be wound on the tyre to improve travel safety of the vehicle.

The special purpose tyres are helpful but expensive, and it is not cost-effective to use the special purpose tyres all the time. Further, to replace the failed tyre or vehicle wheel, special tools are required for demounting the tyre or vehicle wheel and mounting again the spare tyre or vehicle wheel, which is time consuming and troublesome and requires for professional skills. Therefore, more cost-effective, quick, easy and convenient measures are needed to deal with any potential accident on the tyre or vehicle wheel.

SUMMARY OF THE INVENTION

In view of the above problems, the invention provides an auxiliary wheel and an unassisted lifting jack for mounting and demounting the auxiliary wheel.

In an aspect, an auxiliary wheel including a hub and a tyre is configured to be fixedly and coaxially mounted on a vehicle wheel of a motor vehicle.

Preferably, the auxiliary wheel includes at least one first locking assembly on the hub, which is used to fix the auxiliary wheel onto a hub of the vehicle wheel, so that the auxiliary wheel is driven by the hub of the vehicle wheel.

Preferably, the first locking assembly is used to fix the auxiliary wheel onto the hub of the vehicle wheel by means of at least one through hole in the hub of the vehicle wheel; or the first locking assembly is used to connect with a second locking assembly on the hub of the vehicle wheel, to fix the auxiliary wheel on the hub of the vehicle wheel.

Preferably, the first locking assembly includes a catch device and a self-locking device with continuous locking positions, and the self-locking device includes:

a housing with a cavity that is fixed on or formed integrally with the hub of the auxiliary wheel, where a wall of the cavity includes a first frictional contact face and a fourth frictional contact face;

a locking member including a second frictional contact face and a third frictional contact face, which is configured to be at least partially within the cavity so that the second and third frictional contact faces face the first and fourth frictional contact faces, respectively; and a first lock block arranged between and in contact with the first and second frictional contact faces, and a second lock block arranged between and in contact with the third and fourth frictional contact faces, so that the first and second lock blocks allow the locking member to be movable in a first direction relative to the housing, but locked in a second direction opposite to the first direction, and the locking member is allowed to be locked at any of the continuous locking positions;

the movement of the locking member in the first direction causes the catch device to abut against the hub of the vehicle wheel, in order to sandwich the hub of the vehicle wheel between the self-locking device and the catch device; and the locking of the locking member in the second direction prevents the catch device from releasing from the hub of the vehicle wheel.

Preferably, the first frictional contact face forms an angle $\alpha$ with respect to the second frictional contact face, the fourth frictional contact face forms an angle $\alpha'$ with respect to the third frictional contact face, and $\alpha \leq \phi_1 + \phi_2$ and $\alpha' \leq \phi_3 + \phi_4$, where $\phi_1$ and $\phi_2$ represent a frictional angle between the first lock block and the first frictional contact face and that between the first lock block and the second frictional contact face, respectively, and $\phi_3$ and $\phi_4$ represent a frictional angle between the second lock block and the third frictional contact face and that between the second lock block and the fourth frictional contact face, respectively.

More preferably, $0 < \alpha \leq 17°$ and $0 < \alpha' \leq 17°$, and more preferably $a = a'$, $\phi_1 = \phi_2$, and $\phi_3 = \phi_4$.

Preferably, the self-locking device further includes a holding member, which is used for applying forces on the first and second lock blocks, so that the first lock block is kept in contact with the first and second frictional contact faces and the second lock block is kept in contact with the third and fourth frictional contact faces when the locking member is locked at the locking position.

Preferably, the holding member includes at least one spring and a lock block retainer extending through the cavity, the locking member extends through the lock block retainer, and a longitudinal side wall of the lock block retainer includes a first hole for accommodating the first lock block and a second hole for accommodating the second lock block;

the at least one spring is arranged within the cavity and applies elastic forces on the first and second lock blocks; or the spring is arranged external to the housing, between the external surface of the housing and a flange at an end of the lock block retainer, and applies an elastic force on the lock block retainer.

In another aspect, the first locking assembly includes a catch device and a self-locking device with continuous locking positions, and the self-locking device includes:

a housing with a cavity that is fixed on or formed integrally with the hub of the auxiliary wheel, where a wall of the cavity includes a first frictional contact face;

a locking member including a second frictional contact face, which is configured to be at least partially within the cavity so that the second frictional contact face faces the first frictional contact face; and a first lock block arranged between and in contact with the first and second frictional contact faces, so that the first lock block allows the locking member to be movable in a first direction relative to the housing, but locked in a second direction opposite to the first direction, and the locking member is allowed to be locked at any of the continuous locking positions;

here, the movement of the locking member in the first direction causes the catch device to abut against the hub of the vehicle wheel, in order to sandwich the hub of the vehicle wheel between the self-locking device and the catch device; and the locking of the locking member in the second direction prevents the catch device from releasing from the hub of the vehicle wheel.

Preferably, the first frictional contact face forms an angle with respect to the second frictional contact face, and the angle is less than or equal to the sum of a frictional angle between the first lock block and the first frictional contact face and that between the first lock block and the second frictional contact face; preferably, the angle between the first and second frictional contact faces is less than or equal to 17°.

Preferably, the self-locking device further includes a holding member, which is used for applying a force on the first lock block, so that the first lock block is kept in contact with the first and second frictional contact faces when the locking member is locked at the locking position.

Preferably, the frictional contact faces have a groove complementary with the shape of the lock block.

Preferably, the housing, the locking member and the lock block are made of steel.

Preferably, the locking member is a disc wheel with is rotatablely connected with the housing and rotatable in the first and second directions; more preferably, a handle for rotating the disc wheel extends radially from the disc wheel.

Preferably, the catch device includes a rod mechanism and a catch mechanism hinged to the rod mechanism, the rod mechanism is used to extend through a through hole in the hub of the auxiliary wheel to engage with the locking member, so that the movement of the locking member in the first direction causes the catch mechanism to abut against a side of the vehicle wheel hub that is away from the hub of the vehicle wheel.

Preferably, the rod mechanism and the catch mechanism are connected movably or formed integrally, and/or the rod mechanism and the locking member are connected movably or formed integrally; more preferably, if the rod mechanism and the catch mechanism are connected movably, one end of the catch mechanism is rotatablely connected with the hub of the auxiliary wheel, and the other end of the catch mechanism abuts against or releases from the hub of the vehicle wheel under the driving of the rod mechanism; more preferably, the catch device further comprises a member which is used for applying an elastic force on the catch mechanism, to release the catch mechanism from the hub of the vehicle wheel when the catch mechanism is unlocked.

Preferably, the first locking assembly further includes an adaptation module which has a shape complementary with that of the through hole in the hub of the vehicle wheel and is embedded into the through hole when the auxiliary wheel is placed onto the hub of the vehicle wheel.

Preferably, one end of the catch mechanism is rotatablely connected with the adaptation module, and the other end of the catch mechanism abuts against or releases from the hub of the vehicle wheel under the driving of the locking member.

Preferably, the second locking assembly is a stake which is to be locked by the first locking assembly. An annular locking groove is formed on the stake, and the first locking assembly comprises a lock block retainer, at least one lock block, a self-locking cap, an elastic member and a cover; the lock block retainer is fixed onto or formed integrally with the hub of the auxiliary wheel, the stake extends through the lock block retainer, at least one lock block receiving hole is formed in the longitudinal side wall of the lock block retainer, the number and position of the at least one lock block receiving hole correspond to the number of the at least one lock block and the position of the annular locking groove, respectively, the lock block is inserted into the lock block receiving hole, the self-locking cap surrounds the lock block retainer and has a tapered contact face that faces the lock block, the cover is fixedly attached to the lock block retainer, and the elastic member is used to apply an elastic force on the cap, to cause the tapered contact face of the cap to press and drive the lock block into the annular locking groove.

Preferably, a contact face of the stake relative to the lock block forms an angle with respect to a contact face of the cap relative to the lock block, and the angle is less than or equal to the sum of a frictional angle between the lock block and the contact face of the stake and that between the lock block and the contact face of the cap.

Preferably, the first locking assembly further comprises a cam lever, which includes a cam and a handle attached to the cam, the cam is hinged with the self-locking cap and in contact with the cover, and is switchable between its locking position and unlocking position; when the cam lever is at its locking position, the tapered contact face of the cap presses and drives the lock block into the annular locking groove, and when the cam lever is at its unlocking position, the cap is lifted to cause the releasing of the lock block from the annular groove.

Preferably, the tyre includes an external tyre and spikes that are attached to the external tyre and protrude from the external surface of the external tyre; more preferably, the tyre further comprises an isolator arranged between an inner tyre of the tyre and the external tyre.

Preferably, the tyre further includes a spike seat attached to the external tyre, and the spikes are formed on a substrate, which is slidable along a pole of the spike seat, with the pole extending through a through hole in the substrate. Thus, the inventive auxiliary wheel, which is easy for manufacturing, has a good anti-flip effect and little damage to the road.

In a further aspect, an unassisted lifting jack useful for lifting an auxiliary wheel to be mounted includes a receiving seat and a climbing block which are rotatablely connected, the bottom of the climbing block and that of the receiving seat are in the same plane, and the climbing block has a slope for climbing by a vehicle wheel.

The locking assembly of the invention may be easily locked and unlocked with a high efficiency. Further, the auxiliary wheel is very compact relative to the traditional spare wheel, thus has good portability. The inventive lifting jack with a simple structure has good portability and adaptability and easy to use.

BRIEF DESCRIPTION OF THE DRAWINGS

The accompanying drawings, which form a part of the application, are intended to provide further understanding of the invention. Illustrative embodiments of the invention are intended to explain, but not to limit, the invention.

FIGS. 6A-6C show a front view, a sectional view along a line A-A and a rear view of an example of the locking assembly employing the second example of the self-locking device, respectively;

DETAILED DESCRIPTION OF THE EMBODIMENTS

The invention is described below referring to the accompanying drawings and embodiments. The embodiments or features in the embodiments may be combined without conflict.

The auxiliary wheels of the invention are fixedly and coaxially mounted on various conventional vehicle wheels, generally at the outer side of the vehicle wheels. Particularly, the auxiliary wheel may be mounted or connected on the hub and/or shaft of the vehicle wheel, for the purpose of anti-slip, preventing the tyre burst, working in place of any failed vehicle wheel, etc.

To mount the auxiliary wheel on the shaft of the conventional vehicle wheel, one or more bolts for mounting the vehicle wheel are used to pass through preformed screw holes in the auxiliary wheel, then pass through the screw holes of the vehicle wheel, and be screwed into the shaft of the vehicle wheel to mount the auxiliary wheel on the vehicle wheel. The case where the auxiliary wheel is mounted on the hub of the vehicle wheel is described in detail below.

An axial direction refers to a direction along the rotation axis of the vehicle wheel, a radial direction refers to a direction along the diameter of the vehicle wheel, and a radial plane refers to a plane containing the vehicle wheel diameter that is perpendicular to the axial direction. Further, an inner side of vehicle wheel refers to a side of the vehicle wheel that is adjacent to the wheel shaft, while an outer side of vehicle wheel refers to a side of the vehicle wheel that is away from the wheel shaft. The vehicle wheel here may be any type of wheels used for daily travel of the vehicle. A linkage path refers to any through hole used for mounting the auxiliary wheel on the hub of the vehicle wheel, such as lightening holes in the wheel hub.

Figure 1A:
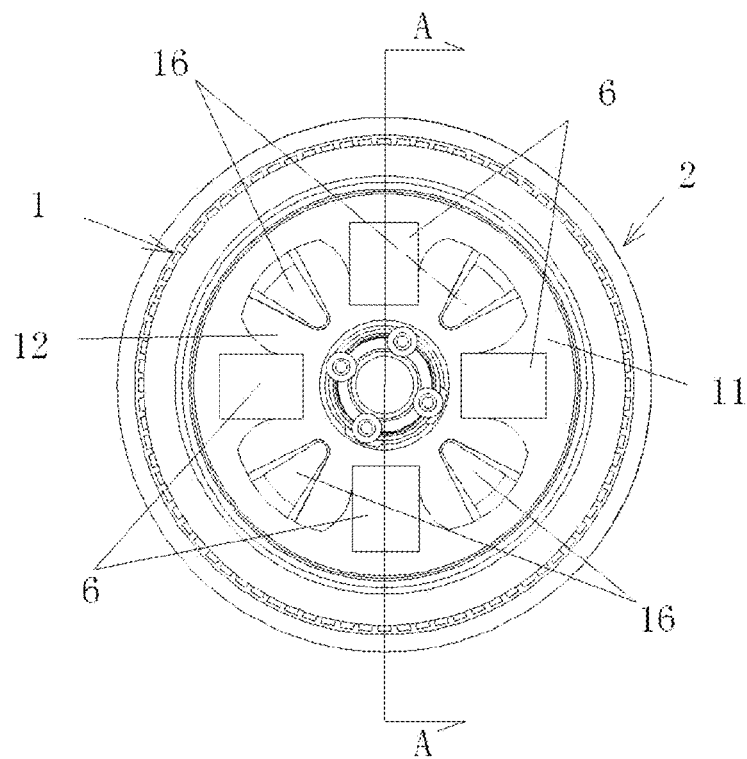
FIG. 1A shows a front view of an auxiliary wheel of an embodiment of the invention mounted on a conventional vehicle wheel, where the hub of the auxiliary wheel is fixedly mounted on the hub of the vehicle wheel.
Figure 1B:
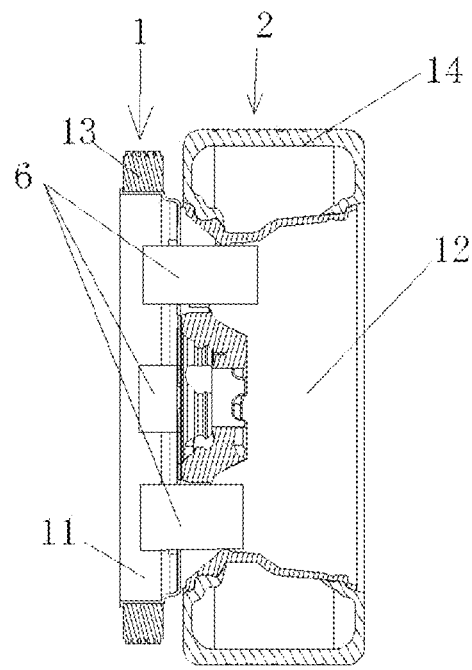
FIG. 1B shows a sectional view along a line A-A of the auxiliary wheel mounted on the vehicle wheel of FIG. 1A.

FIGS. 1A-1B show a front view of a vehicle wheel with the auxiliary wheel of the invention. As shown in FIG. 1B, the vehicle wheel 2 includes a hub 12 and a tyre 14. The auxiliary wheel 1 includes a hub 11, a tyre 13 (as shown in FIG. 1B), and one or more locking assemblies 6 fixed on the hub 11. The locking assemblies 6 function to fix the auxiliary wheel 1 on the hub 12 of the vehicle wheel 2, so that the auxiliary wheel 1 may be driven by the hub 12. The locking assemblies 6 are shown as blocks in FIGS. 1A-1B. The auxiliary wheel 1 is preferably coaxial with the vehicle wheel 2 and at the outer side of the vehicle wheel 2, and may function in place of the vehicle wheel 2.

The locking assemblies 6 may be received in through holes 16 of the hub 12 of the vehicle wheel 2 to fix the auxiliary wheel 1 on the hub 12. Alternatively, each of the locking assemblies 6 may be engaged with another matching locking assembly on the hub 12 to fix the auxiliary wheel 1 on the hub 12. The locking assembly in the invention, which is safe and easy for using, has a simple structure and may be manufactured easily at a low cost, as described below.

Figure 2A:
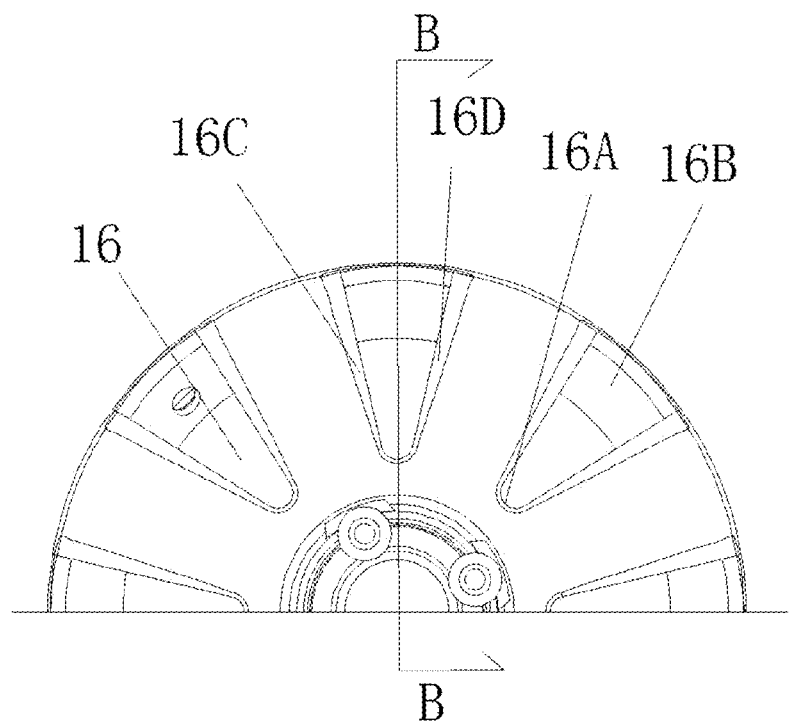
FIG. 2A shows a partial front view of the vehicle wheel hub for illustrating the auxiliary wheel of the embodiment.

FIG. 2A shows an illustrative hub of the vehicle wheel on which the auxiliary wheel of the invention is mounted. FIG.

Figure 2B:
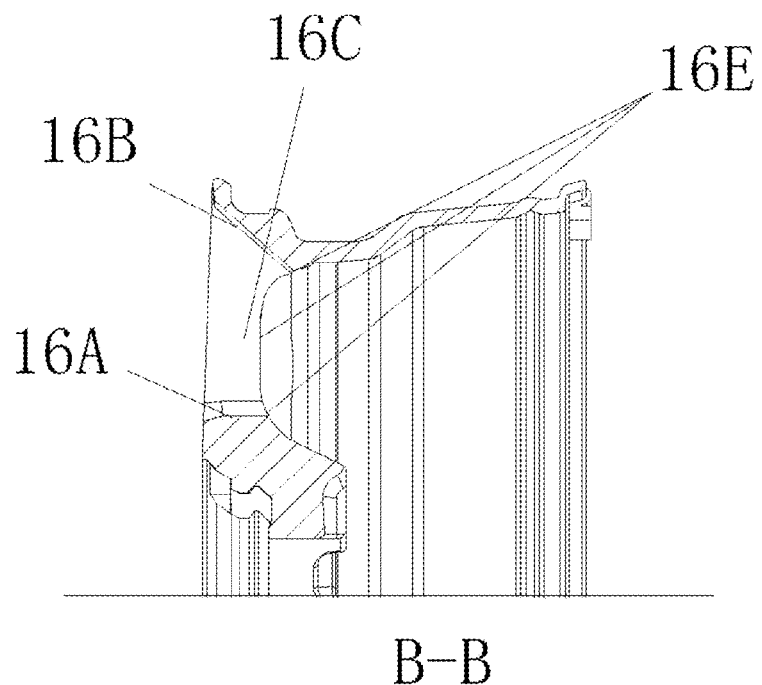
FIG. 2B shows a sectional view along a line B-B of the vehicle wheel hub of FIG. 2A.

2B shows a sectional view along a line A-A (i.e. a radial sectional view) of the hub of the vehicle wheel. As shown in FIG. 2A, the hub 12 contains through holes (e.g. lightening holes) 16, each of which includes side walls 16A-16D that are matching with an adaptation module described below. As shown in FIG. 2B, the hub 12 also includes internal walls 16E, against which the catch mechanism described below abuts.

Figure 3A:
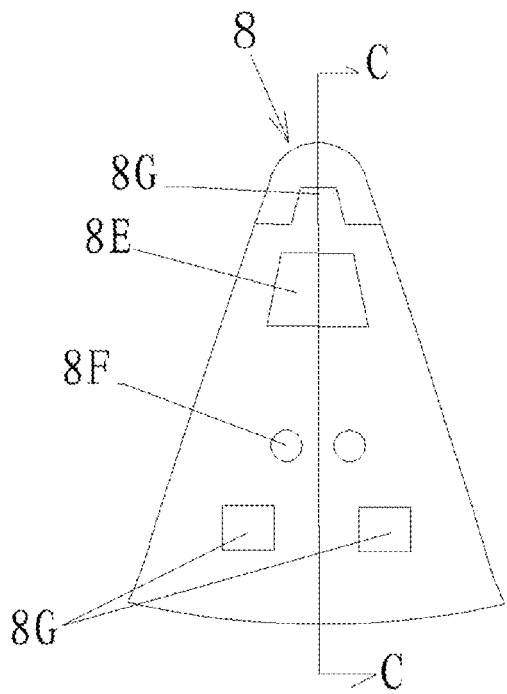
FIG. 3A shows a front view of an example of an adapting module used for the auxiliary wheel of the embodiment.
Figure 3B:
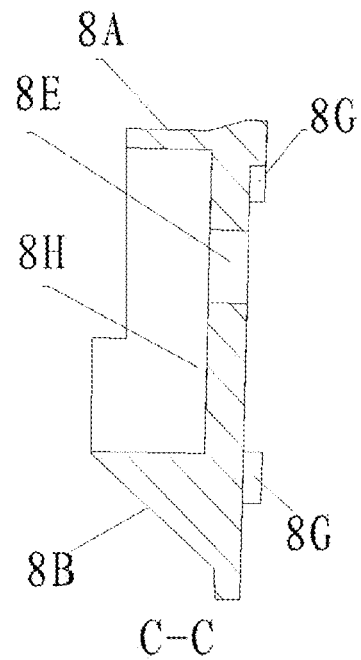
FIG. 3B shows a sectional view along a line C-C of the adapting module of FIG. 3A.
Figure 3C:
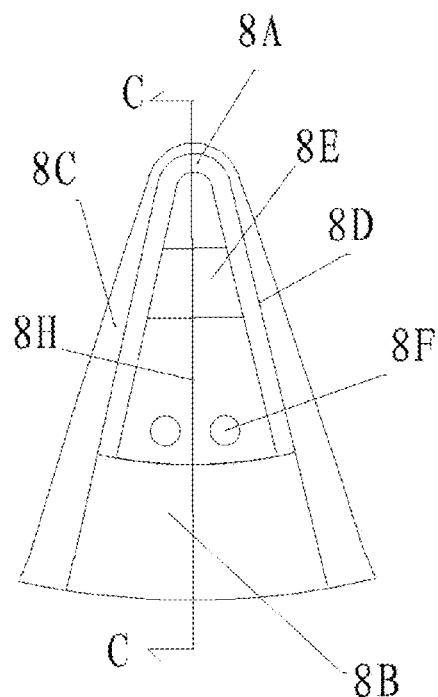
FIG. 3C shows a rear view of the adapting module of FIG. 3A.

The locking assembly 6 of the auxiliary wheel preferably includes the adaptation module 8 that has a shape complementary with that of the through hole 16, as shown in FIGS. 3A-3C. When the auxiliary wheel 1 is engaged with the vehicle wheel 2, the adaptation module 8 is inserted into the through hole 16 of the hub 12, so that side walls 8A-8D of the adaptation module 8 abut against the side walls 16A-16D, to achieve stable fixing and positioning of the auxiliary wheel on the hub 12.

When the auxiliary wheel 1 is locked on the vehicle wheel 2, each adaptation module 8 is located in the through hole 16 in the hub 12 of the vehicle wheel 2. The engagement between the side walls 16C-16D of the through hole 16 and the side walls 8C-8D of the adaptation module 8 allows the torsion transmission between the vehicle wheel 2 and the auxiliary wheel 1, and the engagement between the side walls 16A-16B of the through hole 16 and the side walls 8A-8B of the adaptation module 8 allows the coaxial positioning of the auxiliary wheel 1 on the vehicle wheel 2.

FIGS. 3A-3C show an illustrative structure of the adaptation module used in the auxiliary wheel of the invention. The adaptation module 8 has a shape matching with that of the through hole 16 to be placed in and tightly engaged with the through hole 16.

Preferably, the adaptation module 8 includes one or more positioning members 8G, which match with corresponding positioning members on the hub 11 of the auxiliary wheel 1, so that the positioning member 8 may be precisely positioned. Alternatively, the positioning member may be positioned and fixed on the hub 11 by screw holes 8F. The positioning member may be fixed on the hub 11 in various manners, such as a screw connection, a snap-fit connection, adhering, a rivet connection, etc., or formed integrally with the hub 11.

The principles and examples of the locking assembly are described below.

Figure 4A:
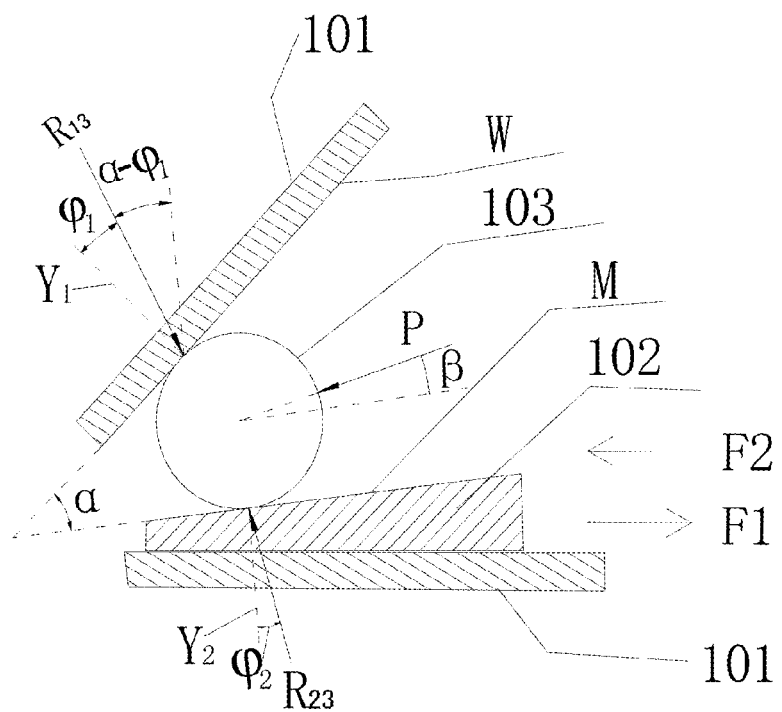
FIG. 4A shows principles of a first example of a self-locking device used in a locking assembly of the auxiliary wheel of the invention.

The locking assembly 6 includes a self-locking device with continuous locking positions. In a first example of the self-locking device, as shown in FIG. 4A, the self-locking device includes a housing 101 with a cavity, a locking member 102 that is at least partially within the cavity, and a lock block 103. The wall of the cavity includes a first frictional contact face (i.e. a locking face) W. A second frictional contact face M, which faces the face W and forms an angle α with the face W, is provided on the locking member 102. The lock block 103 is arranged between and contacts with the faces W and M, and may have a shape, such as a spherical shape, a cylindrical shape and a polyhedral shape, that may vary as desired. The locking assembly 6 preferably further includes a holding member (not shown), which may be a spring. One end of the spring is arranged on the housing 101, and the other end of the spring applies a pretightening force on the lock block 103 towards the vertex of the angle α. The locking member 102 may be in contact with the housing 101, with no or substantially no frictional force between the locking member and the housing.

The lock block 103 is in frictional contact with the frictional contact faces W and M within the housing, to lock the locking member 102, particularly to allow the locking member 102 to be movable in a first direction F1 with respect to the housing but be locked in a second direction F2 opposite to the first direction F1, so that the locking member 102 may be locked at any continuous locking positions. The first direction F1 substantially points to the vertex of the angle α. If a force opposite to the direction of the vertex of the angle α is applied to the lock block 103 (against the pretightening force of the spring in the presence of the holding member) to separate the lock block 103 from at least one of the frictional contact faces W and M, the lock block 103 is released and hence the locking member 102 is unlocked. That is, the locking member 102 can be moved along the second direction F2. Thus, the locking member 102 can be locked in the second direction F2 as long as the lock block 103 is in frictional contact with the faces W and M.

The theory about self-locking of the first example of the self-locking device is described below.

As shown in FIG. 4A, a force applied to the lock block 103 by the first frictional contact face W is denoted by $R_{13}$, a force applied to the lock block 103 by the second frictional contact face M is denoted by $R_{23}$, the pretightening force P, which is at an angle β with respect to the second frictional contact face M, is applied to the lock block 103 by a spring, the first frictional contact face W is at an angle α with respect to the second frictional contact face M, a frictional angle and a friction factor between the lock block 103 and the first frictional contact face W are denoted by $\phi_1$ and $\mu_1$, respectively, and a frictional angle and a friction factor between the lock block 103 and the second frictional contact face M are denoted by $\phi_2$ and $\mu_2$, respectively, where $\mu_1 = \tan \phi_1$ and $\mu_2 = \tan \phi_2$. $\mu_1$ may be the same with or different from $\mu_2$. The normals of the first and second frictional contact faces are denoted by $Y_1$ and $Y_2$, respectively.

Figure 4B:
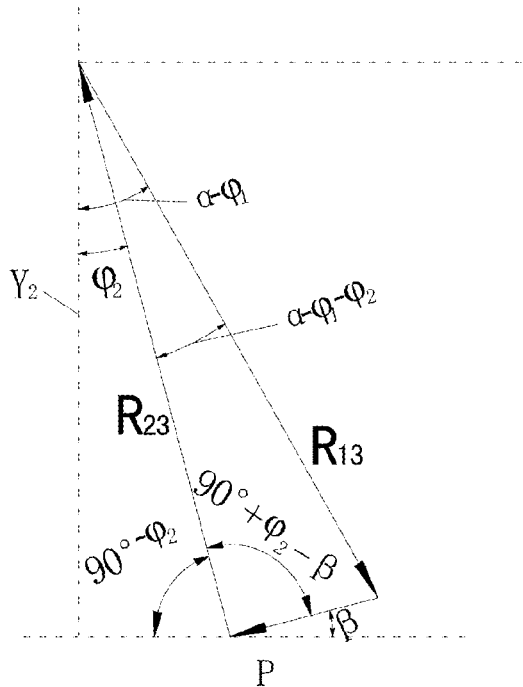
FIG. 4B shows a schematic force triangle illustrating the principles of the first example of the self-locking device of the invention.

According to such a criterion that the generated resistance is less than or equal to zero in the case of reversal of stroke, as shown in FIG. 4B, a self-locking condition is determined as follows.

$$\frac{R_{13}}{\sin(90° + \varphi_2 - \beta)} = \frac{P}{\sin(\alpha - \varphi_1 - \varphi_2)},$$

that is, $$P = R_{13} \frac{\sin(\alpha - \varphi_1 - \varphi_2)}{\cos(\varphi_2 - \beta)},$$

therefore, to prevent the release of the lock block from the first and second frictional contact faces, P shall be less than or equal to 0. Considering $-90'<\phi_2-\beta<90'$, then $\cos(\phi_2-\beta)>0$, and hence $\alpha \leq \phi_1 + \phi_2$, i.e. the condition for self-locking.

That is, if the angle α is less than or equal to the sum of the frictional angles $\phi_1$ and $\phi_2$, i.e. $\alpha \leq \phi_1 + \phi_2$, the locking member 102 is allowed to be moved in the first direction F1 with respect to the housing 101, but locked in the second direction F2 opposite to the first direction F1, so that the locking member can be continuously locked, i.e. locked at any of continuous locking positions.

If the housing, the locking member and the lock block are all made of steel, the frictional angles $\phi_1 = \phi_2 = 8.5°$ since the friction factor of steel is about 0.15, thus the angle α is less than or equal to about 17°. However, the components of the self-locking device may be made of any other suitable material, or the components may be of different material, and even the same component of the device may be made of various materials.

Based on the operation principle of the first example of the self-locking device, it is possible to combine multiple, e.g. two, self-locking devices as desired.

Figure 4C:
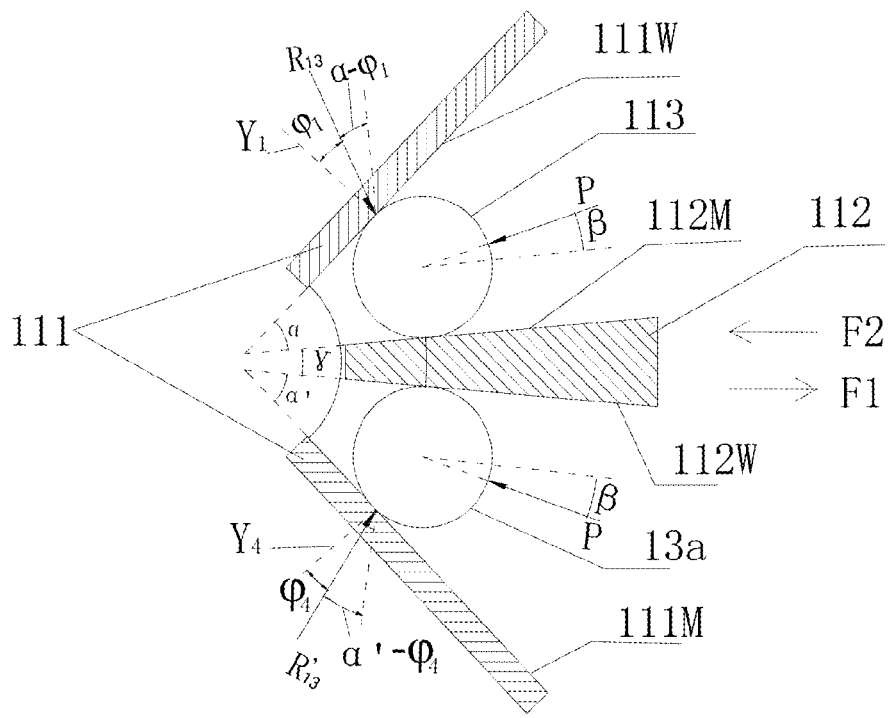
FIGS. 4C-4D respectively show structures and principles of a second and a third examples of the self-locking device used in a locking assembly of the auxiliary wheel of the invention.
Figure 4D:
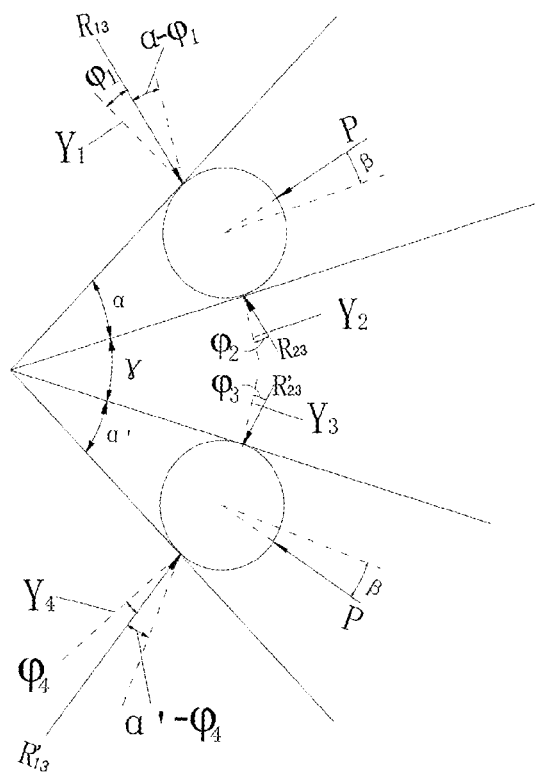

FIGS. 4C-4D show the structure and operation principles of the second and third examples of the self-locking device used in the locking assembly of the auxiliary wheel of the invention.

As shown in FIG. 4C, the second or third example of the self-locking device actually is consisted of two first examples of the self-locking device. Particularly, the self-locking device in the second or third example includes a housing 111 with a cavity, a locking member 112 that is at least partially within the cavity, a first lock block 113 and a second lock block 113a. The wall of the cavity includes a first and a fourth frictional contact faces 111W, 111M. A second and a third frictional contact faces 112M, 112W are provided on the locking member 112. The first and second frictional contact faces 111W and 112M face each other and form an angle $\alpha$, and the fourth and third frictional contact faces 111M and 112W face each other and form an angle $\alpha'$. The first lock block 113 is arranged between and contacts with the first and second frictional contact faces, and the second lock block 113a is arranged between and contacts with the third and fourth frictional contact faces. The self-locking device may further include holding members (not shown), which apply pretightening forces on the first and second lock blocks 113-113a towards the vertexes of the angles $\alpha$ and $\alpha'$, respectively.

If the angle $\alpha$ between the first and second frictional contact faces (111W, 112M) meets $\alpha \leq \phi_1 + \phi_2$, and the angle $\alpha'$ between the third and fourth frictional contact faces (112W, 111M) meets $\alpha' \leq \phi_3 + \phi_4$, where $\phi_1$ and $\phi_2$ denote the frictional angle between the first lock block 113 and the first frictional contact face and that between the first lock block 113 and the second frictional contact face, respectively, and $\phi_3$ and $\phi_3$ denote the frictional angle between the second lock block 113a and the third frictional contact face and that between the second lock block 113a and the fourth frictional contact face, the locking member 112 may is movable along a first direction F1 with respect to the housing 111 but is locked in a second direction F2 opposite to the first direction F1, and hence can be locked at any continuous locking position. Further, if the angle between the second and third frictional contact faces (112M, 112W) is denoted by $\gamma$, and the angle between the first and fourth frictional contact faces (111W, 111M) is denoted by $\theta$, then $\theta \leq \phi_1 + \phi_2 + \phi_3 + \phi_4 + \gamma$. The above angles may be designed according to the above principles, so that the locking member can be locked at any continuous locking positions by the lock blocks.

The second example of the self-locking device used in the locking assembly arranged on the hub of the auxiliary wheel is described below. The locking assembly includes a self-locking device with continuous locking positions and a catch device associated with the self-locking device, as shown in FIGS. 5A-5D. The self-locking device includes a housing 121, a locking member 122 and two lock blocks (123, 123a), and preferably further includes a holding member (e.g. springs 124).

Figure 5A:
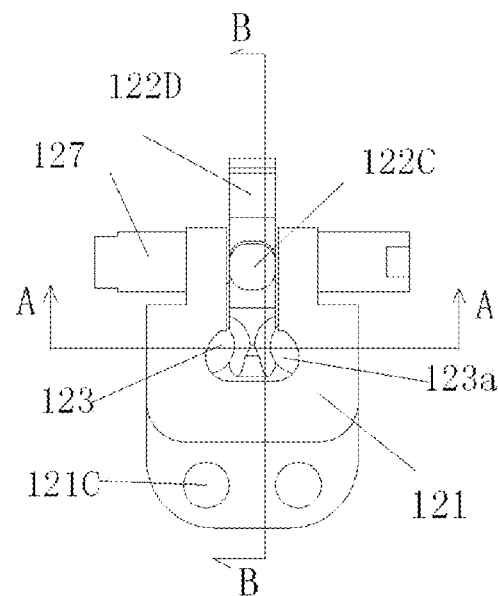
FIGS. 5A-5D show a front view and sectional views along lines A-A, B-B and C-C of the second example of the self-locking device used in a locking assembly of the auxiliary wheel of the invention, respectively.
Figure 5B:
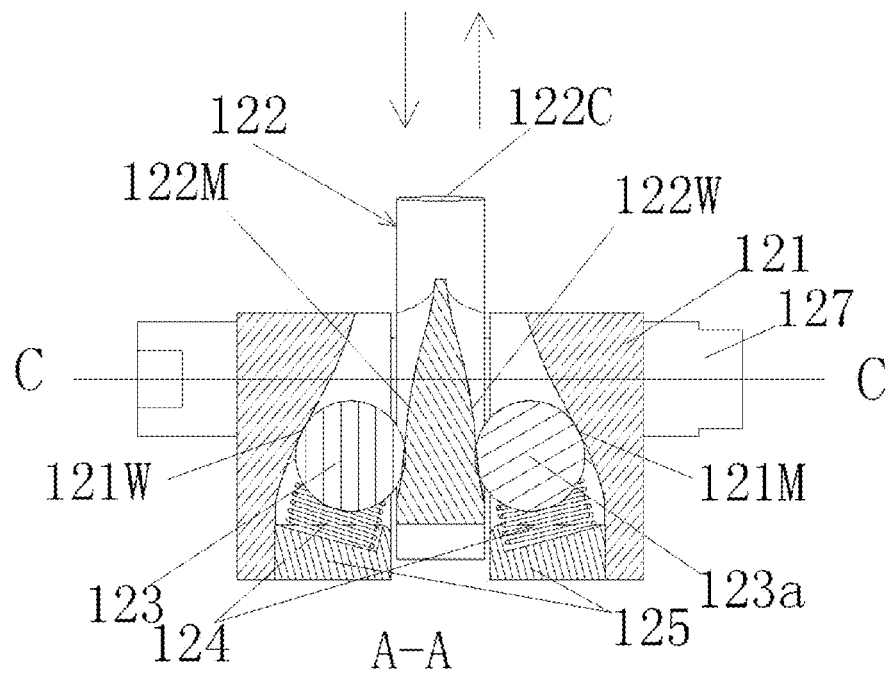
Figure 5C:
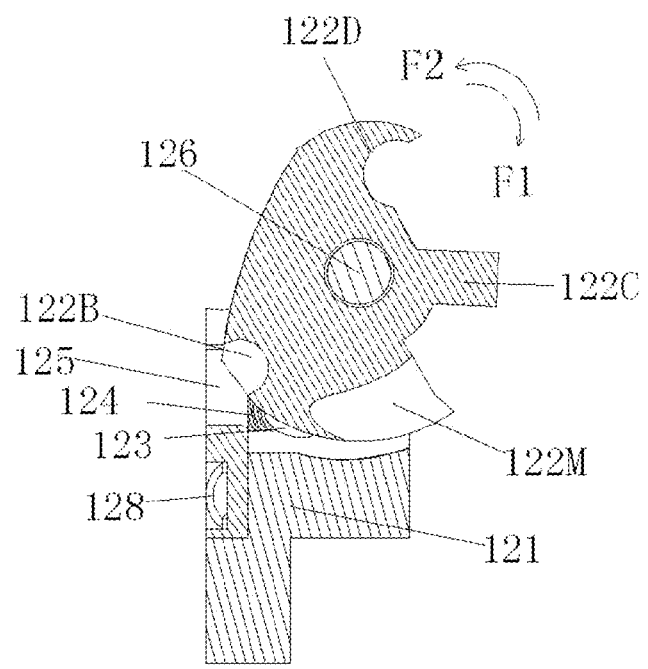
Figure 5D:
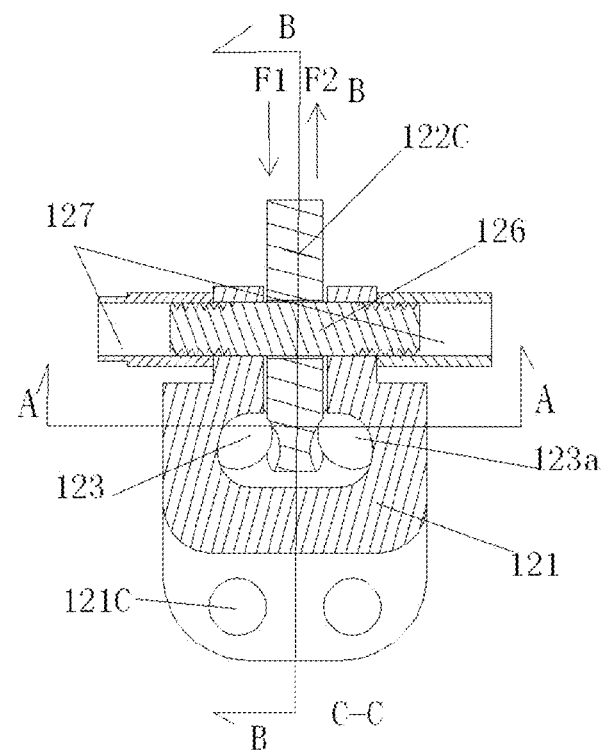

As shown in FIGS. 5A-5D, the housing 121 is fixed on the hub of the auxiliary wheel, alternatively formed integrally with the auxiliary wheel. The housing 121 contains a cavity, the wall of which includes two frictional contact faces 121W and 121M (which are equivalent to the first and fourth frictional contact faces 111W, 111M shown in FIG. 4C). Two frictional contact faces 122M and 122W (which are equivalent to the second and third frictional contact faces 112W, 112M shown in FIG. 4C) are provided on the locking member 122, which is designed to be at least partially within the cavity of the housing 121, so that the faces 122M and 122W of the locking member 122 face the faces 121W and 121M of the housing 121, respectively. As shown in FIG. 5C, the locking member 122 is rotatablely connected to the housing 121, for example, hinged to the housing 121 through a pin 126. The housing 121 functions to fix its components and/or itself. The rotation of the locking member 122 relative to the housing 121 causes the faces 122M and 122W to be moved relative to the faces 121W and 121M. For example, the locking member 122 may be a disc wheel, which is rotatablely connected to the housing 121 through a pin 126 perpendicular to the side faces of the disc wheel, and the faces 122M and 122W are provided on both side faces of the disc wheel.

The two lock blocks 123 and 123a are received within the housing 121, with the lock block 123 being sandwiched between and in contact with the faces 121W and 122M, and the lock block 123a being sandwiched between and in contact with the faces 121M and 122W. The self-locking device including the frictional contact faces 121W, 122M, 121M and 122W and the lock blocks 123 and 123a is equivalent to the self-locking device shown in FIG. 4C, and the lock blocks 123 and 123a allows the locking member 122 to be movable in the first direction F1 relative to the housing 121 but locked in the second direction F2 opposite to the first direction F1, so that the locking member 122 can be locked at any continuous locking position. Once the lock block 123 or 123a is separated from the frictional contact face of the housing or locking member by a force applied to the lock block, the locking member 122 is allowed to be moved in the second direction F2 and thus is unlocked. Preferably, the angle between the faces 121W and 122M is less than or equal to the sum of the frictional angle between the lock block 123 and the face 121W and that between the lock block 123 and the face 122M, and the angle between the faces 121M and 122W is less than or equal to the sum of the frictional angle between the lock block 123a and the face 121M and that between the lock block 123a and the face 122W.

The frictional contact faces 121W and 121M within the housing 121 and the lateral frictional contact faces 122M and 122W of the locking member 122 may have a partial annular shape (the center of which is located at the center of the pin 126). All the frictional contact faces may have a flat shape, or any other shape complementary with the lock blocks 123 or 123a. Preferably, all the frictional contact faces are shaped to allow for rolling or sliding of the lock blocks 123 and 123a on the frictional contact faces and the increased contact area between the lock blocks (123, 123a) and the frictional contact faces. For example, the lock block may have a spherical shape and the corresponding frictional contact faces have a recessed shape. The housing 121 may be fixedly connected to the hub 11 of the auxiliary wheel through screw holes 121C.

Two open grooves 122B are preferably provided in the two frictional contact faces of the locking member 122, so that the locking member 122 is unlocked before its use, to facilitate the use and improve the use efficiency of the device.

Preferably, the self-locking device further includes spring retainers 125, springs 124 and screws 128 for fixing the spring retainers. The springs 124, together with the spring retainers 125, apply an elastic pretightening force on the lock blocks 123 and 123a. The spring retainer 125 may be fixed onto the housing 121 through screws 128, or be formed integrally with the housing 121. The pin 126, which functions as the rotation shaft of the locking member 122, may be further fixed to the housing 121 by nuts 127.

The locking assembly may further include a catch device as described in detail below. An engaging tab 122D used to engage with the catch device extends from the periphery of the locking member 122, i.e. the disc wheel. A handle 122C used for rotating the locking member 122 additionally extends radially from the periphery of the locking member 122.

Figure 6D:
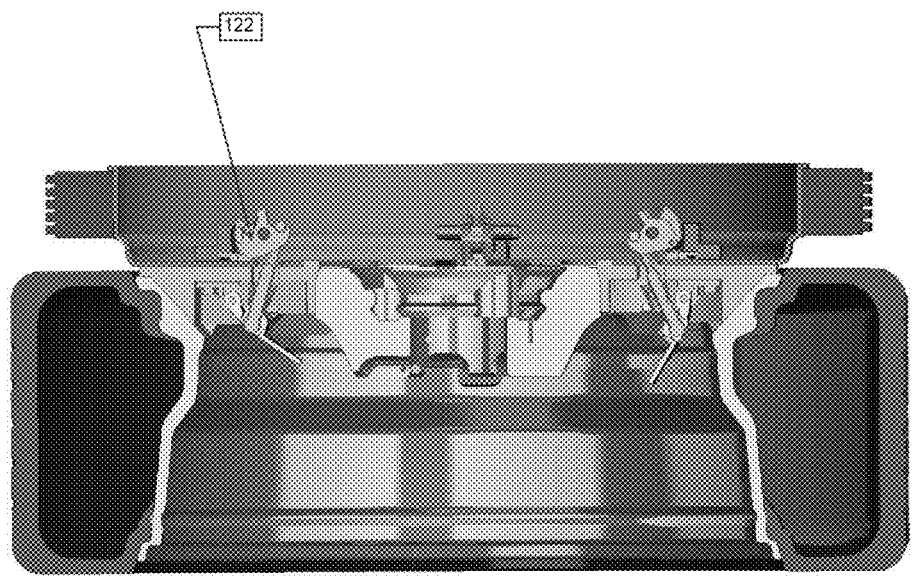
FIG. 6D shows a radial sectional view of both the vehicle wheel and the auxiliary wheel mounted on the hub of the vehicle wheel, where the locking assembly shown in FIGS. 6A-6C is mounted on the auxiliary wheel.

FIGS. 6A-6C shows the locking assembly with the second example of the self-locking device. The assembly includes the self-locking device mounted on the hub 11 of the auxiliary wheel and a catch device that is mounted on the adaptation module 8 attached to the hub 11. The catch device includes a rod mechanism 120 and a catch mechanism 110 rotatablely hinged to the rod mechanism 120. One end 110B of the catch mechanism 110 is rotatablely hinged to the adaptation module 8, while the other end of the catch mechanism 110 that is opposite to the end 110B is used to abut against the inner wall of the hub of the vehicle wheel. The rod mechanism 120 passes through the through hole in the hub of the auxiliary wheel to be movably engaged with the engaging tab 122D of the locking member 122, so that the movement of the locking member 122 in the first direction F1 causes the catch mechanism 110 to abut against the vehicle wheel hub (particularly the inner wall 16E of the vehicle wheel hub, i.e. a side of the vehicle wheel hub that is away from the auxiliary wheel, for example), in order to sandwich the vehicle wheel hub between the self-locking device and the catch device (particularly the catch mechanism). However, the locking of the locking member 122 in the second direction F2 prevents the catch mechanism from releasing from the vehicle wheel hub. Therefore, when the catch mechanism 110 is locked, the auxiliary wheel is fixedly mounted on the vehicle wheel hub, and when the catch mechanism 110 is unlocked, the auxiliary wheel may be released from the vehicle wheel hub.

The adaptation module 8 may be fixed on the inner side of the hub 11 of the auxiliary wheel, or formed integrally with the hub 11. The catch device may further include a seat 130 for the catch mechanism 110 (shown in FIG. 6B) fixedly arranged in a recess 8H (shown in FIG. 3C) of the adaptation module 8. The catch mechanism 110 is hinged to the seat 130 through a pin 126B, as shown in FIG. 6B. An intermediate engaging portion 110A of the catch mechanism 110 is hinged to an end 120A of the rod mechanism 120. The seat 130 may be also formed integrally with the adaptation module 8. Alternatively, the catch mechanism 110 may be directly hinged to the adaptation module 8 without the seat 130.

The rod mechanism 120, a catch mechanism 110' (see FIG. 8), and/or the locking member 132 (see FIG. 8A) may extend through the adaptation module 8 via the opening 8E (see FIGS. 3A and 3E) in the adaptation module 8.

A flexible part may be arranged between the adaptation module 8 and the vehicle wheel hub 12 to prevent any possible damage made to the hub 12 by the adaptation module 8. The flexible part may be elastic or non-elastic and made of various flexible materials. Further, the adaptation module 8 may be eliminated, in this case, one end of the catch device 110 is directly hinged to the hub 11 of the auxiliary wheel, or to the seat 130 fixed on the hub 11.

The catch device may further include a part, such as a spring 124A, which applies an elastic force to the catch mechanism 110 to keep the unlocked catch mechanism 110 away from the vehicle wheel hub (i.e. at an open position). As shown in FIG. 6B, the rod mechanism 120 extends through the spring 124A, one end of which rests against the adaptation module 8 and the other end of which rests against the catch mechanism 110.

The rod mechanism may be movably connected with or formed integrally with the catch mechanism and/or the disc wheel.

Figure 7:
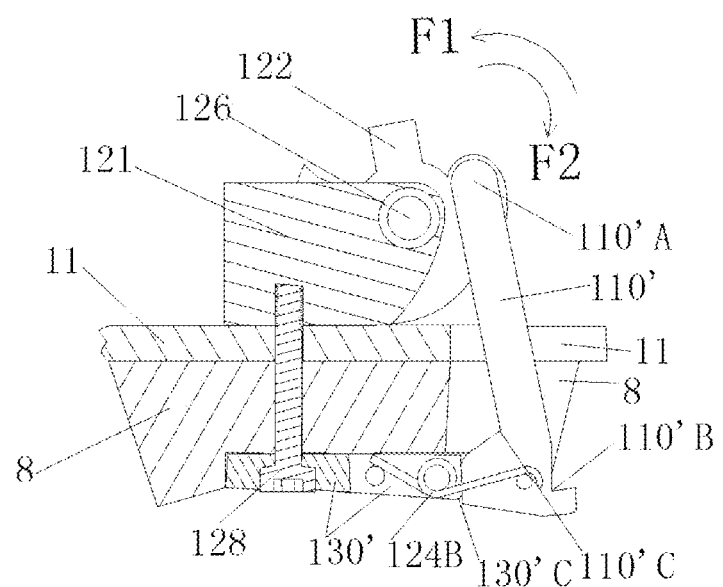
FIG. 7 shows a sectional view along a line A-A of a locking assembly, which is similar to the locking assembly of FIGS. 6A-6C but includes a catch mechanism of a different form.

FIG. 7 shows the case where the rod mechanism is formed integrally with the catch mechanism, and shows the assembly of the adaptation module 8, the self-locking device, the catch mechanism 110', the seat 130' for the catch mechanism, a torsion spring 124B and the hub 11 of the auxiliary wheel. As shown in FIG. 7, one end 110'A of the catch mechanism 110' (which is equivalent to the rod mechanism 120 and the catch mechanism 110 shown in FIG. 6B) is directly hinged to the locking member 122 of the self-locking device of the locking assembly, and the other end of the catch mechanism 110' is an abutting end 110'B. An end 130'C of the seat 130' may function as a pivot point used for the locking and opening of the abutting end 110'B. The torsion spring 124B is arranged on the seat 130', one end of the torsion spring 124B is fixed on the seat 130' and the other end is fixed on the abutting end 110'B of the catch mechanism 110'. In the unlocked state of the self-locking device, the locking member 122 is allowed to rotate freely and thus the abutting end 110'B of the catch mechanism 110' is released away from the vehicle wheel hub under the effect of the torsion spring 124B, in this case, the catch mechanism 110' rests against the end 130'C of the seat 130' by its recess 110'C.

FIG. 7 shows the locked state of the catch mechanism 110', where the abutting end 110'B of the catch mechanism 110' rests against the vehicle wheel hub. To put the catch mechanism 110' into its locked state, the locking member 122 is rotated in the locking direction F1 to pull the catch mechanism 110', and the abutting end 110'B of the catch mechanism 110' is supported by the end 130'C of the seat 130' and abuts against the inner wall 16E of the vehicle wheel hub 12, to lock the hub 11 of the auxiliary wheel on the vehicle wheel. While in the unlocked state of the locking assembly, the locking member 122 may be rotated freely in the unlocking direction F2, and the catch mechanism 110' may return to its released state under the effect of the torsion spring 124B.

The catch mechanism may be of any form, as long as it can abut against the vehicle wheel hub when driven by the rod mechanism.

FIGS. 8A-8D show a schematic structural representation of a third example of the self-locking device, which is a variant of the second example of the self-locking device and operates with the same principles as the second example. The self-locking device in the third example includes a housing 131, a locking member 132, two lock blocks 133 and 133a, and a lock block retainer 136 (which is actuated to lock and unlock the device, as described below), and preferably includes a holding member (e.g. springs 134).

The third example of the self-locking device is generally different from the second example of the self-locking device by adopting a different locking member 132 and introducing a lock block retainer 136, but these examples operate in the same self-locking principles. The housing 131 in the third example contains a cavity, wall of which includes two frictional contact faces 131W and 131M (which are equivalent to the frictional contact faces 121W and 121M in FIG. 5B), and the locking member 132 includes two frictional contact faces 132M and 132M (which are equivalent to the frictional contact faces 122W and 122M in FIG. 5B) and is arranged at least partially within the cavity of the housing 131, so that the faces 132M and 132W face the faces 131W and 131M, respectively.

The lock block 133 is arranged between and contacts with the frictional contact faces 131W and 132M, and the lock block 133a is arranged between and contacts with the frictional contact faces 131M and 132W. The self-locking device having the frictional contact faces 131W, 132M, 131M, 132W and the lock blocks 133, 133a is equivalent to the one shown in FIG. 5B, and the lock blocks 133 and 133a allow the locking member 132 to be movable in the first direction F1 relative to the housing 131 but be locked in the second direction F2 opposite to the first direction F1, so that the locking member 132 can be locked at any of continuous locking positions. Once the lock block 133 or 133a is separated from the corresponding frictional contact face of the housing or locking member by a force applied to the lock block, the locking member 132 is allowed to be moved in the second direction F2 and thus is unlocked. Preferably, the angle α between the faces 131W and 132M is less than or equal to the sum of the frictional angle $\phi_1$ between the lock block 133 and the face 131W and the frictional angle $\phi_2$ between the lock block 133 and the face 132M, and the angle α' between the faces 131M and 132W is less than or equal to the sum of the frictional angle $\phi_3$ between the lock block 133a and the face 131M and the frictional angle $\phi_4$ between the lock block 133a and the face 132W.

Preferably, the vertexes of the angles α and α' substantially point the direction F2. Preferably, α=α', and/or $\phi_1=\phi_2$, and/or $\phi_3=\phi_4$. The lock blocks 133 and 133a are symmetrical with respect to the locking member 132.

The lock block retainer 136 is extended into the cavity of the housing 131, and the locking member 132 is extended through the lock block retainer 136. The lock blocks 133 and 133a are arranged in holes in the longitudinal (i.e. in the direction of F1 or F2) side wall of the lock block retainer 136, so that the lock block retainer 136 may be used to actuate the lock blocks 133 and 133a and prevent irregular movements of the lock blocks 133 and 133a. In this embodiment, the lock blocks 133 and 133a have a column shape which is complementary with that of the hole in the longitudinal side wall of the retainer 136.

Figure 8A:
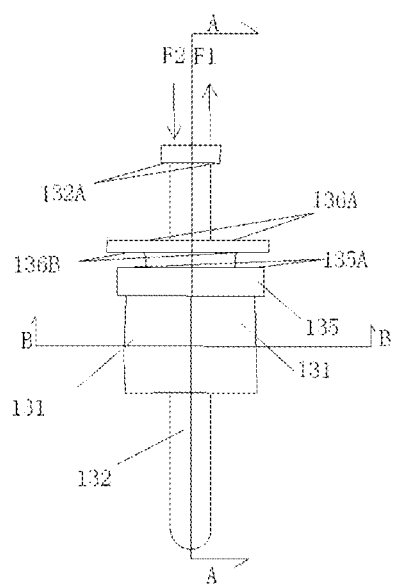
FIGS. 8A-8D shows a front view and sectional views along lines C-C, A-A and B-B of a third example of the self-locking device in the locking assembly of the invention, respectively.
Figure 8B:
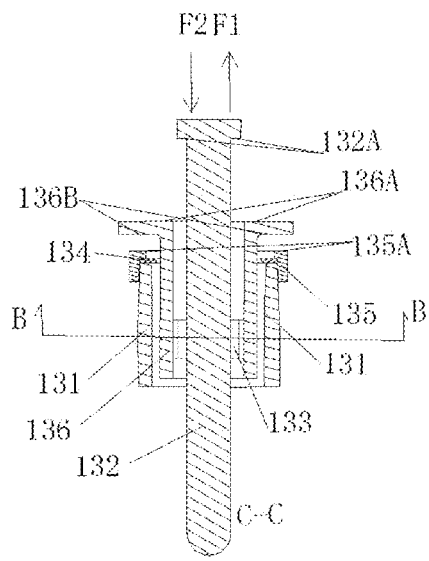

The lock block retainer 136 may be used for locking and unlocking the self-locking device. For example, as shown in FIG. 8A, the lock block retainer 136 has a flange at its one end along its longitudinal direction (i.e. the direction F1 or F2), and the lock block retainer 136 may be moved in the direction F2 if a prying face 136A on the top of the flange is pressed down. Further, a pivot face 132A facing the prying face 136A is provided at one end of the locking member 132, and the locking member 132 may be moved in the direction F1 by lifting the pivot face 132A. To lock the self-locking device, a prying rod 7B or 7C (shown in FIGS. 11B-11C) is inserted between and pries the prying face 136A and the pivot face 132A, and the prying face 136A is pressed down while the pivot face 132A is lifted by the prying rod through a lever principle, thus the locking member 132 is lifted in the direction F1 while the lock block retainer 136 is pressed down, and the lock block retainer 136 in turns pulls the two lock blocks 133-133a down which are then sandwiched tightly between the frictional contact faces 131W and 132M and between the frictional contact faces 131M and 132W, respectively, in this way, any retracting stroke is prevented during the locking of the self-locking device and any deformation of the locking member and the housing is absorbed. The lock block retainer 136 may also have a pivot face 136B, which may be lifted to pull up the lock block retainer 136 in the direction F1; further, a prying face 135B facing the pivot face 136B may be provided on the housing 131 or any other part (e.g. a spring retainer 135) fixed on the housing 131. To unlock the self-locking device, the prying rod 7B or 7C is inserted between and pries the pivot face 136B and the prying face 135B, and the pivot face 136B may be lifted by the prying rod through a lever principle, so that the lock block retainer 136 is lifted to pull up the lock blocks 133-133a in the direction F1; in this case, one or both of the lock blocks 133-13a are released from the locking member 132, which is then may be moved in the direction F2. As an alternative to the pivot face 136B, prying holes 136D may be formed in the side wall of the lock block retainer 136 and lifted or pressed by a prying rod to lock or unlock the lock block retainer 136.

In the third example of the self-locking member, a spring retainer 135 is preferably fixed on the housing or formed integrally with the housing. The springs 134 rest on the spring retainer 135 and apply elastic forces on the lock blocks 133-133a, to keep the lock blocks 133-133a to be in contact with both the locking member 132 and the housing 131.

Likewise, the locking member 132 may be used with the catch device and the adaptation module described above with reference to the second example of the self-locking device, so that the movement of the locking member 132 in the first direction F1 causes the catch device to abut against the hub of the vehicle wheel, while the locking of the locking member 132 in the second direction F2 prevents the detachment of the catch device from the hub of the vehicle wheel. Preferably, one end of the locking member 132 is provided with a T-shaped head 132C for hinging with the catch device; alternatively, the locking member 132 has a catch part at its one end and may be used as the catch mechanism to be locked on the hub of the vehicle wheel.

Figure 9:
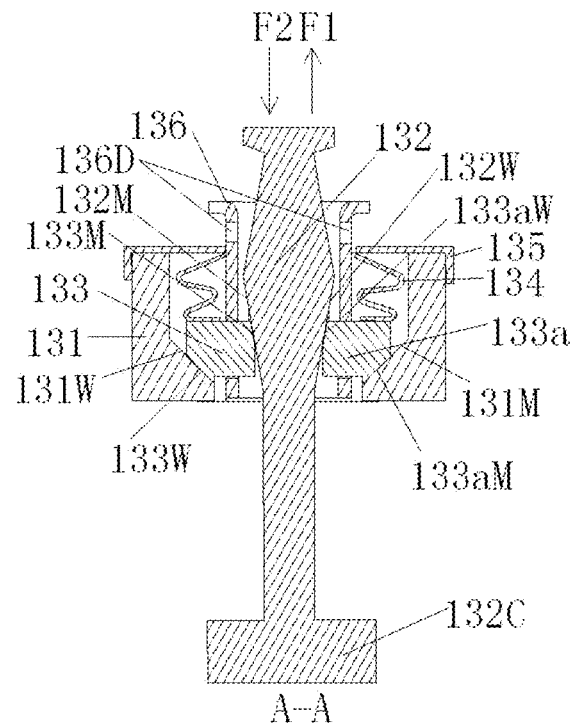
FIG. 9 shows a sectional view along a line A-A of a variant of the third example of the self-locking device in the locking assembly of the invention, where the lock blocks have a shape of pentagonal prism.
Figure 10:
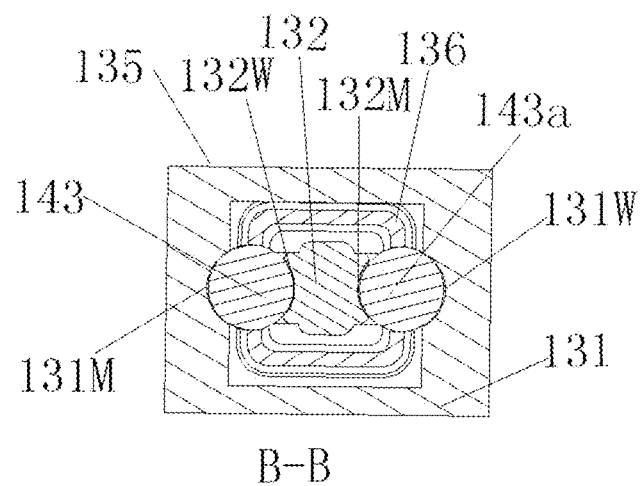
FIG. 10 shows a sectional view along a line B-B of a variant of the third example of the self-locking device in the locking assembly of the invention, where the lock blocks have a spherical shape.

If required, the lock blocks may have a shape of pentagonal prism (with a trapeziform cross-section), as shown in FIG. 9, the lock blocks 133' and 133a' are in surficial contact with the locking member 132 and the housing 131 to increase the frictional contact areas. Such lock blocks 133' and 133a' are helpful in reducing deformation of the frictional contact faces of the locking member 132 and the housing 131. The lock blocks may alternatively have a spherical shape, as illustrated by lock blocks 133" and 133a" shown in FIG. 10. Of course, the lock blocks may have other shapes with triangular, trapeziform, rhombic, irregular cross-sections, for example.

The springs 134, which may be spring leaves or torsion springs, may be used to apply forces on the lock block retainer 136 and/or the lock blocks 133 and 133a, and may be fixed between the housing and the lock blocks, or between the housing and the lock block retainer.

Figure 8C:
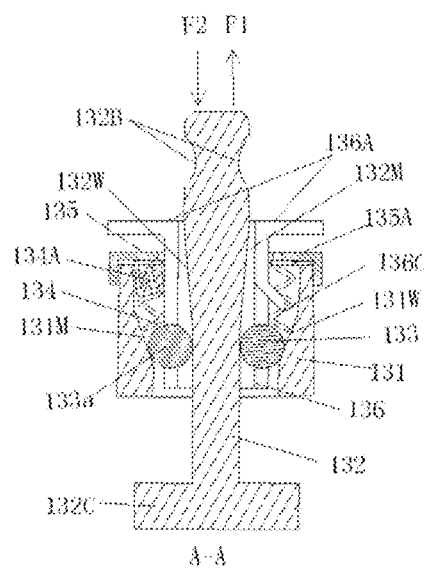
Figure 8D:
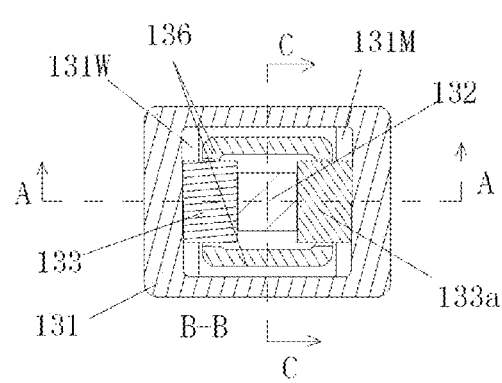

A hook 136C protruding from the side wall of the lock block retainer 136 between both longitudinal ends of the retainer 136 (along the direction F1 or F2), as shown in FIG. 8C, is used for keeping the retainer 136 at a certain position in the unlocked state of the self-locking device. In use, when the prying face 136B of the lock block retainer 136 is lifted by a prying tool, and the hook 136C is raised above the housing 131, at this time, the lock block retainer 136 is pushed and inclined to the side of the hook 136C by a spring 134A arranged within the housing 131, so that the hook 136C rests on the top surface of the housing 131 or the spring retainer 135 and the self-locking may be kept in its unlocked state.

The housing 131 may be fixedly hinged or threadedly connected, or integrally formed with the vehicle wheel hub.

Grooves 132B may be provided on the surface of the locking member 132 to accommodate the lock blocks 133 and 133a in the unlocked state of the self-locking device, to prevent the unintended locking of the locking member 132. The grooves 132B may also be pried by the prying tool to pull the locking member 132.

The self-locking device, the hub 11 of the auxiliary wheel, and the adaptation module 8 may be fixed together in sequence by bouts. In the self-locking device shown in FIGS. 8A-8D, if the locking member 132 is also used as the catch mechanism, in order to lock the auxiliary wheel onto the vehicle wheel, first of all, the vehicle wheel 1 is placed on the vehicle wheel 2, the adaptation module 8 is inserted into the through hole 16 of the vehicle wheel, and the T-shaped head 132C of the locking member 132 is extended through both an opening in the adaptation module and the through hole 16; when the locking member 132 is moved in the direction F1 and locked, its T-shaped head 132C abuts against the inner radial wall 16E of the vehicle wheel hub 12, so that the auxiliary wheel 1 is locked on the vehicle wheel 2. After the self-locking device is unlocked, the T-shaped head 132C is detached from the inner radial wall 16E, and thus the auxiliary wheel 1 may be separated from the vehicle wheel 2.

Tools for locking and unlocking the above self-locking device are described below referring to FIGS. 11A-11C.

Figure 11A:
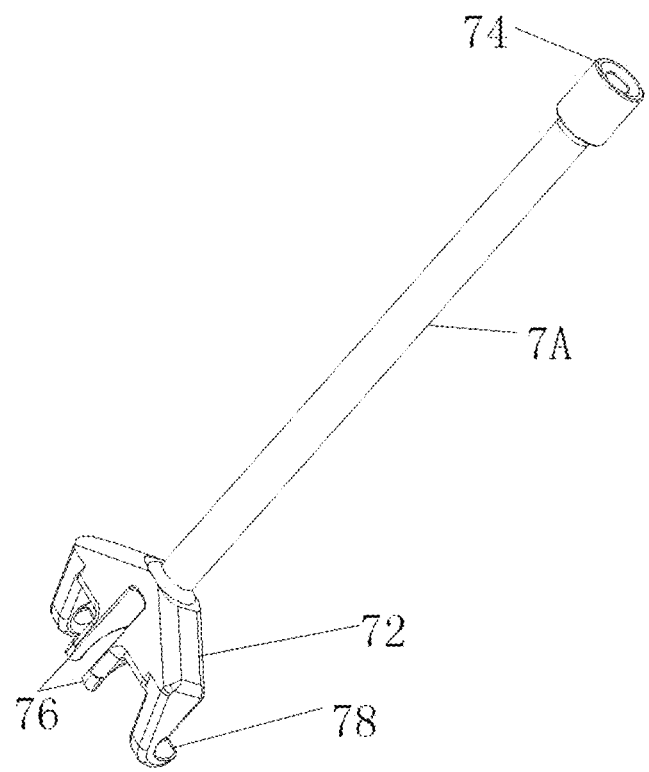
FIG. 11A shows a perspective view of a locking and unlocking tool for the self-locking device according to an embodiment.

A prying rod 7A shown in FIG. 11A may be used for locking and unlocking the second example of the self-locking device. The paying rod 7A has an unlocking end 72 for unlocking the self-locking device and an opposite locking end 74 for locking the self-locking device. Two parallel hooks 78 are respectively arranged at two lateral sides of the unlocking end 72, and two protrusions 76 are arranged between the hooks 78. A recess is formed at the locking end 74. To unlock the self-locking device, the hooks 78 respectively hook the nuts 127 on both sides of the self-locking device (as shown in FIG. 5A), so that the prying rod 7A may be rotated about the nuts; then the lock blocks of the second example of the self-locking device are pressed down by the protrusions 76 of the prying rod 7A due to the rotation of the prying rod 7A in the direction F1, thus the lock blocks are released and the locking member 122 is unlocked. To lock the self-locking device, the locking end 74 of the prying rod 7A is engaged with the handle 122C on the locking member 122 and the prying rod 7A is rotated in the direction F1, so that the self-locking device may be put into its locked state.

Figure 11B:
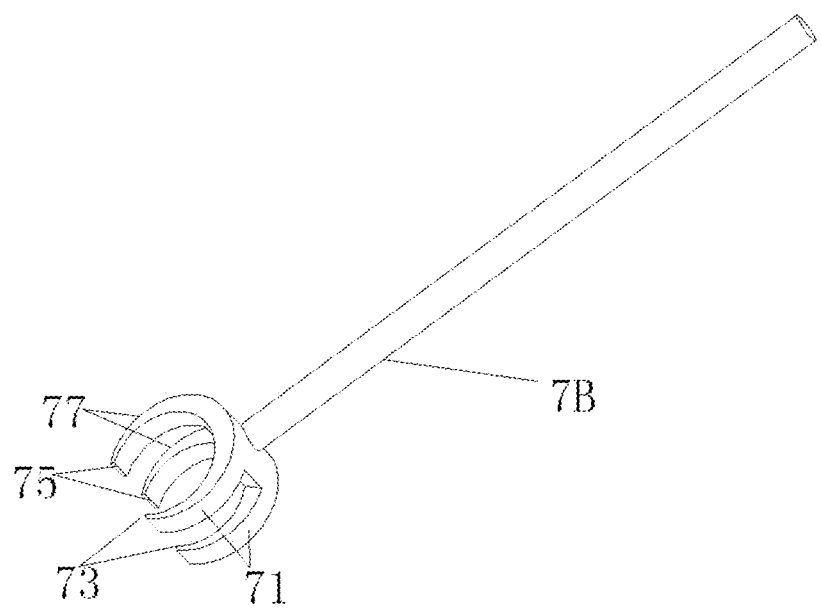
FIG. 11B shows a perspective view of a locking and unlocking tool for the self-locking device according to another embodiment.
Figure 11C:
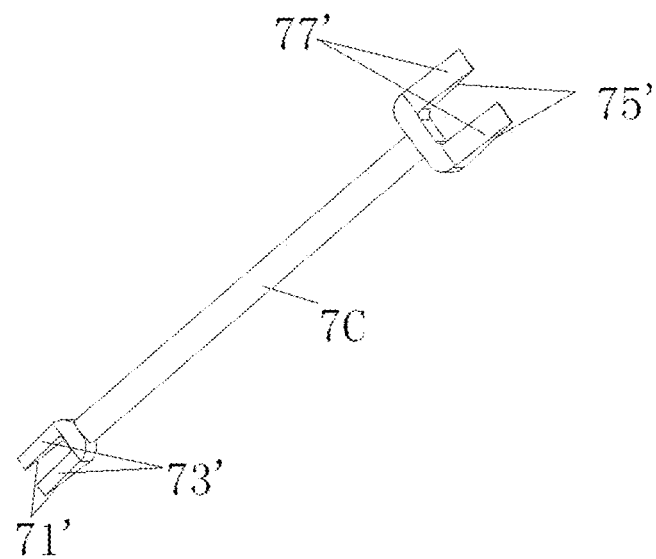
FIG. 11C shows a perspective view of a locking and unlocking tool for the self-locking device according to still another embodiment.

The prying rods 7B and 7C shown in FIGS. 11B-11C may be used for locking and unlocking the third example of the self-locking device.

Two pairs of pawls 7B and 7C are arranged at one end of the prying rod 7B, one of the two pairs of pawls have prying portions 71 and pivot portions 73, while the other one of the two pairs of pawls have prying portions 77 and pivot portions 75. The two pairs of pawls are opposite to each other and form a substantial circle. The gap between one pair of pawls is different from that of the other pair of pawls. Likewise, the gap between a pair of pawls (having two prying portions 71' and two prying portions 73') at one end of the prying rod 7C is different from that between a pair of pawls (having two prying portions 77' and two prying portions 75') at the other end of the prying rod 7C. The pawls of the prying rod 7B or 7C may be inserted between the prying face 136A of the lock block retainer 136 and the pivot face 132A of the locking member 132, or between the pivot face 136B of the lock block retainer 136 and the prying face 135B, to lock and unlock the third example of the self-locking device.

The prying rods 7B and 7C may have a various shape, as long as the prying rods may be used to press down the lock block retainer 136 while lifting the locking member 132, and lift the lock block retainer 136 with respect to the housing 131.

In order for the coaxial connection between the auxiliary wheel 1 and the vehicle wheel 2, a member for matching and fixedly connecting with the locking assembly of the auxiliary wheel is fixedly arranged on the hub 12 of the vehicle wheel, to further facilitate the mounting and demounting of the auxiliary wheel on the vehicle wheel. The member may be a stake.

For example, the locking member of the above self-locking device may function as the stake, and locking and unlocking the locking member relative to the housing allows locking and unlocking the auxiliary wheel relative to the vehicle wheel. For example, the locking member 132 is fixed as the stake on the hub 12 of the vehicle wheel, and the housing 131 is fixed on the hub 11 of the auxiliary wheel, so that locking and unlocking the locking member 132 relative to the housing 131 allows locking and unlocking the auxiliary wheel relative to the hub of the vehicle wheel. Preferably, the housing has a cylindrical shape, while the stake has a column shape, the diameter of the cross-section of the root portion of the stake is less than the diameter of the cross-section of the top portion of the stake, and the lock block has a spherical shape.

Figure 12A:
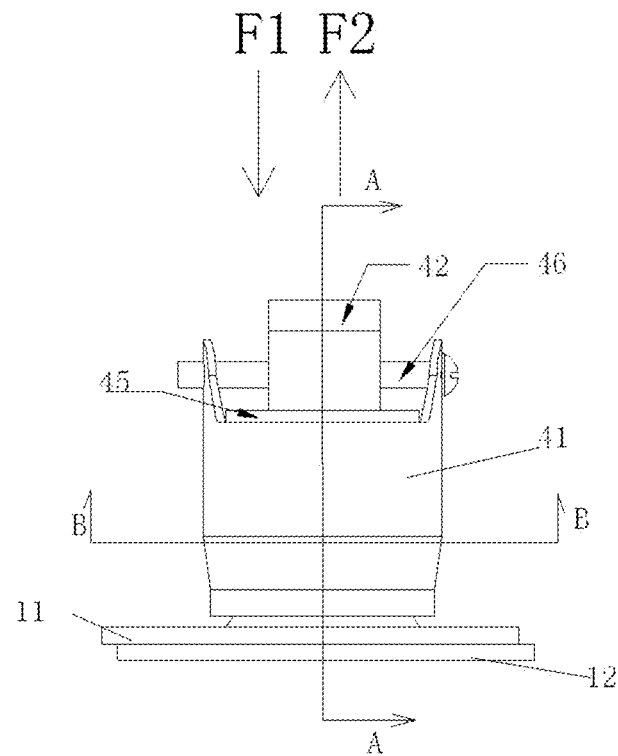
FIGS. 12A-12C show the front view and sectional views along lines A-A and B-B of a stake protruding from the hub of the vehicle wheel and the locking assembly locked on the stake.
Figure 12B:
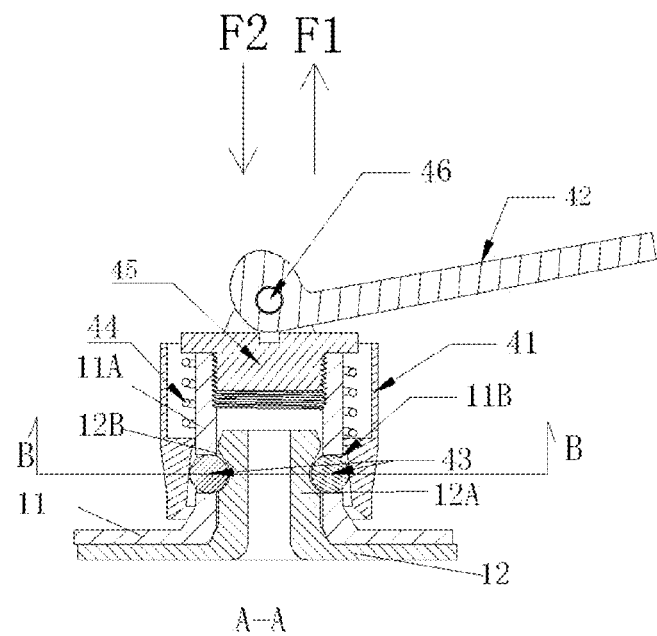
Figure 12C:
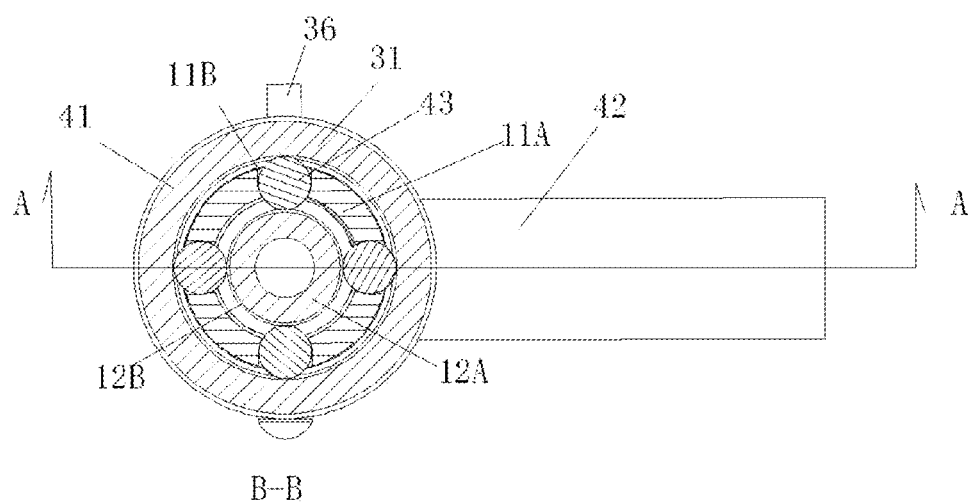

In another example, a stake 12A fixed on the hub 12 of the vehicle wheel is used as the locking member of an individual locking assembly shown in FIGS. 12A-12C, and an annular locking groove 12B is formed on the stake 12A. This locking assembly includes a lock block retainer 11A, lock blocks 43, a self-locking cap 41, an elastic member 44 and a cover 45.

The lock block retainer 11A is fixed on or formed integrally with the hub 11 of the auxiliary wheel, and the stake 12A extends through the retainer 11A. Lock block receiving holes 11B are formed in the longitudinal (i.e. in the direction of F1 or F2) side wall of the lock block retainer 11A, the number and positions of the lock block receiving holes 11B correspond to the number of the lock blocks 43 and the positions of the annular locking groove 12B, respectively.

The lock blocks 43 are inserted into the lock block receiving holes 11B. The self-locking cap 41 surrounds the lock block retainer 11A, and has a tapered contact face that faces the lock block 43. Preferably, the cover 45 is fixedly attached to the lock block retainer 11A, and the elastic member 44 is arranged between the cover 45 and the self-locking cap 41 and used to apply an elastic force on the cap 41, causing the tapered contact face of the cap 41 to tightly press and drive the lock blocks 43 into the annular locking groove 12B.

The stake 12A may be also formed integrally with the hub 12 of the vehicle wheel.

Preferably, the locking assembly in the example further includes a cam lever 42, which includes a cam and a handle attached to or formed integrally with the cam. The cam is hinged with the self-locking cap 41 through a pin 46 and in contact with the cover 45, so that when the cam is rotated about the pin 46 due to the operation of the handle, the self-locking cap 41 may be lifted or moved down (by the elastic member 44) relative to the cover 45, causing the self-locking cap 41 to press on or be released from the lock blocks 43, as a result, the self-locking cap 41 may be switched between its locking position and unlocking position.

In the embodiment, four lock block receiving holes 11B are formed in the side wall of the lock block retainer 11A, but more or less lock block receiving holes 11B and lock blocks 43 may be provided. The diameter of the hole 11B in the internal surface of the side wall of the retainer 11A is less than the diameter of the lock block 43 while the diameter of the hole 11B in the external surface of the side wall of the retainer 11A is larger than the diameter of the lock block 43, to prevent the lock block 43 from fully passing through the internal surface of the side wall.

The lock block 43 may have a spherical shape, an elliptic shape, etc.

Preferably, the internal tapered contact face of the cap 41, the surface of the locking groove 12B on the stake 12A and the lock block 43 form the above first example of the self-locking device. That is, the internal tapered contact face of the cap 41 is equivalent to the first frictional contact face in the first example of the self-locking device, the lock block 43 is equivalent to that in the first example of the self-locking device, and the surface of the locking groove 12B is equivalent to the second frictional contact face in the first example of the self-locking device. The vertex of an angle formed between the internal tapered contact face of the cap 41 and the surface of the locking groove 12B substantially points to a direction from the vehicle wheel to the auxiliary wheel, so that the lock block 43 is movable to the vehicle wheel (i.e. in the direction F2) but not in the opposite direction (i.e. the direction F1). Since the lock block 43 is received in the wall of the lock block retainer 11A and moved together with the retainer 11A, the retainer 11A is allowed to move towards the vehicle wheel when the lock block 43 is locked, and hence the vehicle wheel and the auxiliary wheel are held together. During the driving of the vehicle, if a gap is formed between the vehicle wheel and the auxiliary wheel due to vibration, the gap will be absorbed automatically according to the principle of the self-locking device and the effect of the elastic member 44, so that the auxiliary wheel may be locked more tightly on the vehicle wheel.

In the practical use of the locking assembly, in order for locking, the auxiliary wheel is placed closely on the vehicle wheel, with the stake 12A extending into the lock block retainer 11A, then the cam lever 42 is rotated to its locking position to press down the cap 41, thus the lock blocks 43 are moved in the lock block receiving holes 11B and abut against the locking groove 12B, so that the stake 12A are locked in the lock block retainer 11A and the auxiliary wheel is locked onto the vehicle wheel. In order for unlocking, the cam lever 42 is rotated to its unlocking position to overcome the elastic force of the elastic member 44 and lift the cap 41, in this situation, the lock block 43 is released by the cap 41 and thus the lock block retainer 11A and the stake 12A are unlocked, and the auxiliary wheel may be removed from the vehicle wheel.

One or more the above-described locking assemblies may be used to steadily lock the auxiliary wheel on the vehicle wheel.

Locking means other than the above-described self-locking device may be used for locking an auxiliary wheel on a special-use vehicle.

For example, in a first means, a screw rod with a hook at its one end is adopted, where the hook extends through the through hole 16 and hooks the hub 12 of the vehicle wheel 2, while the other end of the screw rod extends through the mounting hole of the auxiliary wheel 1 and is fixed, thereby coaxially connecting the auxiliary wheel 1 on the vehicle wheel 2 by the screw rod.

In a second means, partial of all of available screws on the hub 12 of the vehicle wheel are used for fixing the auxiliary wheel, by forming screw holes on the hub 11 of the auxiliary wheel 1 which corresponding to the screw holes on the hub 12, in this case, the screws for fixing the hub 12 may be used to pass through both the hubs 11-12 and fix the hub 11 on the hub 12, thereby fixing the auxiliary wheel 1 on the vehicle wheel 2.

Figure 13A:
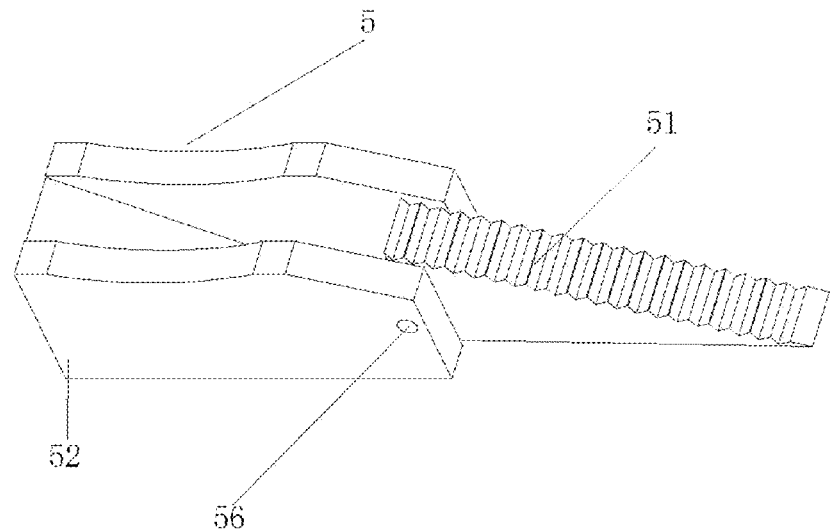
FIGS. 13A-13C show the perspective view, top view and sectional view along a line A-A of an unassisted lifting jack of the invention.
Figure 13B:
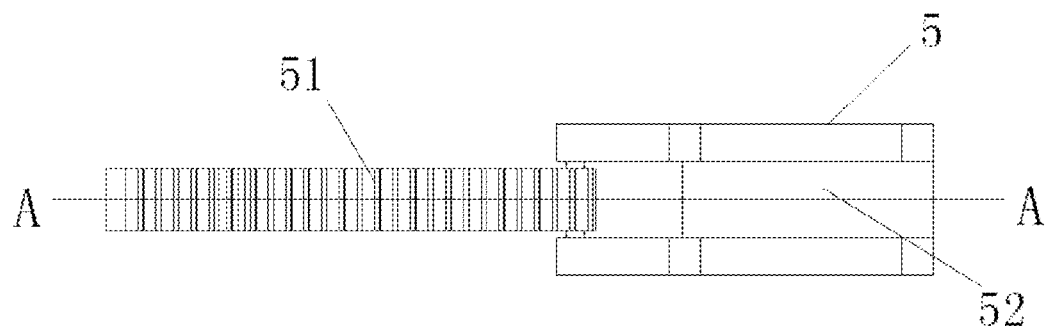
Figure 13C:
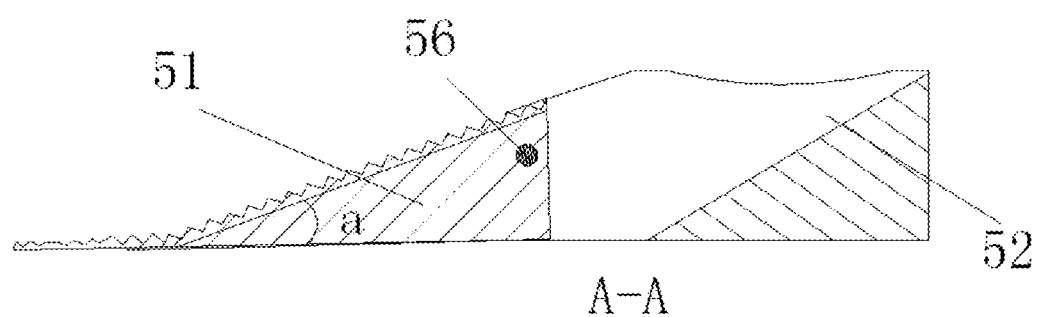

The unassisted lifting jack 5 shown in FIG. 13A is useful for lifting the vehicle wheel 2 easily to mount the auxiliary wheel 1 on the vehicle wheel 2. The unassisted lifting jack 5 includes a receiving seat 52 and a climbing block 51, which are rotatablely connected through a pin 56. In use, the climbing block 51 is rotated out of the receiving seat 52, in this case, the bottom of the climbing block 51 and that of the receiving seat 52 are in the same plane and in contact with the ground, and the climbing block 51 has a slope, over which the vehicle wheel may climb onto the receiving seat 52. The climbing block 51 may be rotated and received within the receiving seat 52, to reduce the size of the unassisted lifting jack 5 for easy carrying. The climbing block 51 has a substantive triangular shape, and may be formed by elastic material. The surfaces of the climbing block 51 that are in contact with the vehicle wheel and the ground may be coarse to increase frictional forces. A recess is formed on the top of the receiving seat 52 for supporting the vehicle wheel steadily.

The auxiliary wheel 1 may function in place of or to assist the conventional vehicle wheel 2. For example, the auxiliary wheel 1 may be used as a backup wheel to take the role of a failed vehicle wheel; and an anti-slip auxiliary wheel 1 may be used for driving on a snowy road. The auxiliary wheel 1 may be provided with a solid, vacuum or composite tyre.

For example, the structure of an auxiliary wheel with an anti-slip function is described below.

Figure 14A:
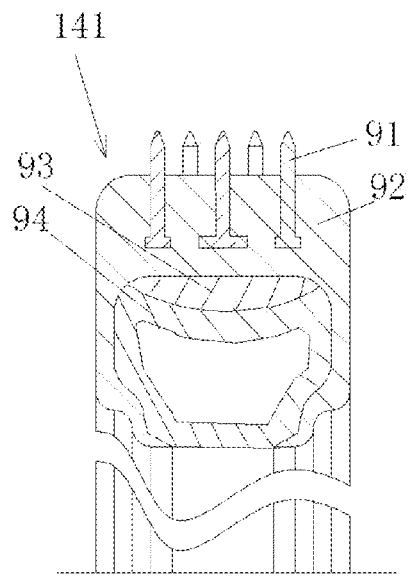
FIG. 14A shows a radial sectional view of an anti-slip auxiliary wheel of an embodiment of the invention.

FIG. 14A shows an auxiliary wheel 141 with anti-slip spikes. Particularly, the auxiliary wheel 141 includes a hub and a tyre, and the tyre includes an inner tyre 94, an external tyre 92, an isolator 93 and anti-slip spikes 91. The anti-slip spikes 91 are fixed on the external tyre 92; the isolator 93, which has an annular shape and is arranged between the inner tyre 94 and the external tyre 92, abuts against the inner wall of the external tyre 92, and is used for preventing any damage made on the inner tyre by the anti-slip spikes or spike seats. The isolator 93 may be omitted if the anti-slip spikes 91 and the spike seats would not damage the inner tyre. Each anti-slip spike 91 includes a flange at its bottom arranged within the external tyre 92, and the top of the anti-slop spike 91 protrudes from the external surface of the external tyre 92.

Alternatively, the auxiliary wheel 141 may include a solid tyre, on which the anti-slip spikes are arranged. Or, the auxiliary wheel may include the external tyre but no inner tyre.

Figure 14C:
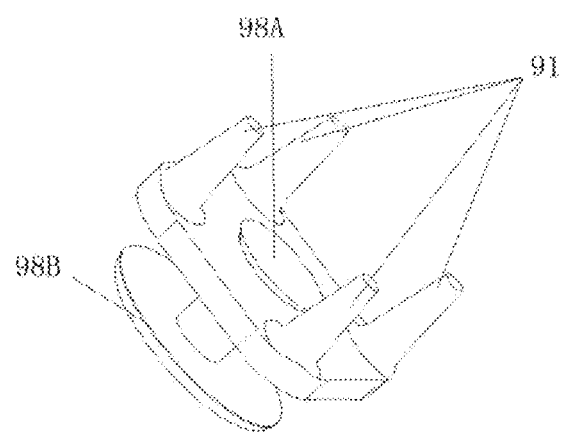
FIG. 14C shows a perspective view of anti-slip spikes used in the anti-slip auxiliary wheel shown in FIG. 14B.
Figure 14B:
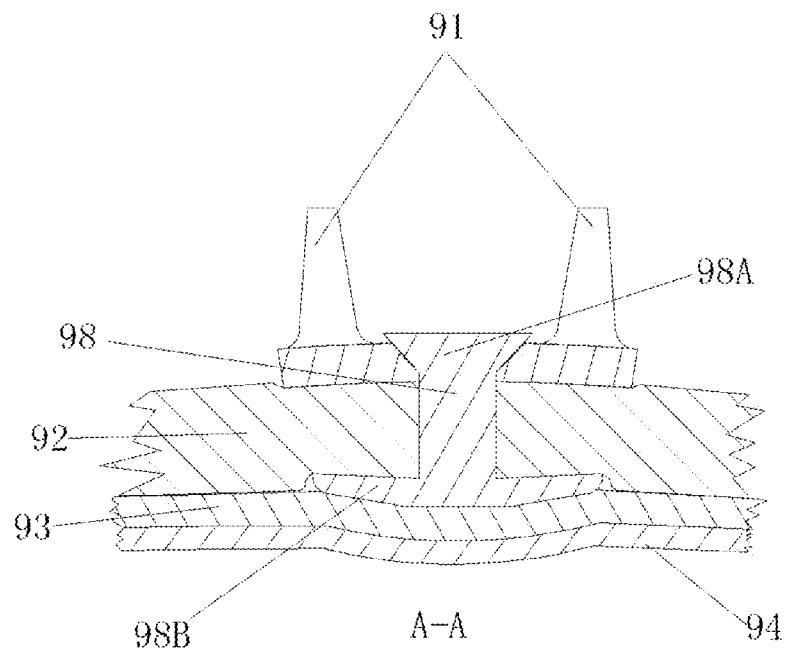
FIG. 14B shows a radial sectional view of an anti-slip auxiliary wheel of another embodiment of the invention.

FIG. 14B shows an anti-slip means arranged on an anti-slip tyre according to an embodiment. FIG. 14C shows the structure of the anti-slip means, which includes a spike seat 98 and anti-slip spikes 91 protruding from a substrate. In the embodiment, a through hole is formed in the substrate. The spike seat 98, which includes a connecting pole and a base 98B, is fixed within the external tyre 92 of the auxiliary wheel. The connecting pole is fixed on the base 98B, and preferably has a smaller diameter than that of the base 98B. A head 98A opposite to the base 98B is arranged on the top of the connecting pole in various ways such as riveting, hinging, threads and snapping. The connecting pole of the spike seat 98 extends through the substrate and then the head 98A is fixed on the connecting pole. Such spike seat 98 ensures that the anti-slip spikes 91 can be mounted on the tyre and prevents the detaching of the spikes 91 from the tyre, and further allows the substrate for the anti-slip spike 91 to be movable along the connecting rod of the spike seat 98 due to the pressure from the ground.

FIGS. 14B-14C show that four spikes 91 are formed on each substrate, but more or less spikes may be formed. The spikes 91 for an anti-slip function pierce into the snowy or muddy road during the driving of a vehicle with such auxiliary wheels.

Each spike may be designed with a cavity in communication with its open free end, the free end preferably has a diameter less than that of the other end of the spike that is connected with the substrate. In this case, when the spike pierces into the road during the driving, snow, mud and so on is entered into the hollow spike from its open end and pushed out from a side opening in communication with the cavity, so that the spike may easily pierce into the snowy or muddy road for an anti-slip effect.

To prevent the spikes 91 from damaging the road, the free ends of the spikes 91 on the auxiliary wheel 1 do not exceed the outer diameter of the vehicle wheel 2. Further, the air pressure in the vehicle wheel 2 or the auxiliary wheel 1 may be adjusted so that the spikes 91 are effectively pressed on the road for anti-slip but will not damage the road.

The preferable embodiments of the invention have been described, but the invention is not limited thereto. Various modifications and alterations to the invention may occur to those skilled in the art, and all such modifications and alterations fall into the scope of the invention, without departing from the principle of the invention.

What is claimed is:

1. An auxiliary wheel comprising a hub, a tire and at least one first locking assembly fixedly arranged on the hub, wherein, the first locking assembly is used to fix coaxially the auxiliary wheel onto a hub of a vehicle wheel by means of at least one through hole in the hub of the vehicle wheel or the first locking assembly is used to connect with a second locking assembly on the hub of the vehicle wheel, so that the auxiliary wheel is coaxially driven by the hub of the vehicle wheel; and, wherein the first locking assembly comprises a catch device and a self-locking device with continuous locking positions, wherein the self-locking device comprises:

a housing with a cavity that is fixed on or formed integrally with the hub of the auxiliary wheel, where a wall of the cavity includes a first frictional contact face and a fourth frictional contact face;

a locking member including a second frictional contact face and a third frictional contact face, which is configured to be at least partially within the cavity so that the second and third frictional contact faces face the first and fourth frictional contact faces, respectively; and a first lock block arranged between and in contact with the first and second frictional contact faces, and a second lock block arranged between and in contact with the third and fourth frictional contact faces, so that the first and second lock blocks allow the locking member to be movable in a first direction relative to the housing, but locked in a second direction opposite to the first direction, and the locking member is allowed to be locked at any of the continuous locking positions;

wherein, the movement of the locking member in the first direction causes the catch device to abut against the hub of the vehicle wheel, in order to sandwich the hub of the vehicle wheel between the self-locking device and the catch device; and the locking of the locking member in the second direction prevents the catch device from releasing from the hub of the vehicle wheel.

2. The auxiliary wheel of claim 1, wherein the first frictional contact face forms an angle $\alpha$ with respect to the second frictional contact face, the fourth frictional contact face forms an angle $\alpha'$ with respect to the third frictional contact face, and $\alpha \leq \phi_1 + \phi_2$ and $\alpha' \leq \phi_3 + \phi_4$, where $\phi_1$ and $\phi_2$ represent a frictional angle between the first lock block and the first frictional contact face and that between the first lock block and the second frictional contact face, respectively, and $\phi_3$ and $\phi_4$ represent a frictional angle between the second lock block and the third frictional contact face and that between the second lock block and the fourth frictional contact face, respectively.

3. The auxiliary wheel of claim 1, wherein the self-locking device further comprises a holding member, which is used for applying forces on the first and second lock blocks, so that the first lock block is kept in contact with the first and second frictional contact faces and the second lock block is kept in contact with the third and fourth frictional contact faces.

4. The auxiliary wheel of claim 3, wherein the holding member comprises at least one spring and a lock block retainer extending through the cavity, the locking member extends through the lock block retainer, and a longitudinal side wall of the lock block retainer includes a first hole for accommodating the first lock block and a second hole for accommodating the second lock block;

the at least one spring is arranged within the cavity and applies elastic forces on the first and second lock blocks; or the spring is arranged external to the housing, between the external surface of the housing and a flange at an end of the lock block retainer, and applies an elastic force on the lock block retainer.

5. The auxiliary wheel of claim 1, wherein, the first locking assembly comprises a catch device and a self-locking device with continuous locking positions, wherein the self-locking device comprises:

a housing with a cavity that is fixed on or formed integrally with the hub of the auxiliary wheel, where a wall of the cavity includes a first frictional contact face;

a locking member including a second frictional contact face, which is configured to be at least partially within the cavity so that the second frictional contact face faces the first frictional contact face; and a first lock block arranged between and in contact with the first and second frictional contact faces, so that the first lock block allows the locking member to be movable in a first direction relative to the housing, but locked in a second direction opposite to the first direction, and the locking member is allowed to be locked at any of the continuous locking positions;

wherein, the movement of the locking member in the first direction causes the catch device to abut against the hub of the vehicle wheel, in order to sandwich the hub of the vehicle wheel between the self-locking device and the catch device; and the locking of the locking member in the second direction prevents the catch device from releasing from the hub of the vehicle wheel.

6. The auxiliary wheel of claim 5, wherein the first frictional contact face forms an angle with respect to the second frictional contact face, and the angle is less than or equal to the sum of a frictional angle between the first lock block and the first frictional contact face and that between the first lock block and the second frictional contact face.

7. The auxiliary wheel of claim 6, wherein, the self-locking device further comprises a holding member, which is used for applying a force on the first lock block, so that the first lock block is kept in contact with the first and second frictional contact faces.

8. The auxiliary wheel of claim 5, wherein, the frictional contact faces have a groove complementary with the shape of the lock block.

9. The auxiliary wheel of claim 1, wherein, the frictional contact faces have a groove complementary with the shape of the lock block.

10. The auxiliary wheel of claim 1, wherein, the locking member is a disc wheel with is rotatably connected with the housing and rotatable in the first and second directions.

11. The auxiliary wheel of claim 1, wherein, the catch device comprises a rod mechanism and a catch mechanism hinged to the rod mechanism, the rod mechanism is used to extend through a through hole in the hub of the auxiliary wheel to engage with the locking member, so that the movement of the locking member in the first direction causes the catch mechanism to abut against a side of the vehicle wheel hub that is away from the hub of the vehicle wheel.

12. The auxiliary wheel of claim 11, wherein, the rod mechanism and the catch mechanism are connected movably or formed integrally, and/or the rod mechanism and the locking member are connected movably or formed integrally;

if the rod mechanism and the catch mechanism are connected movably, one end of the catch mechanism is rotatablely connected with the hub of the auxiliary wheel, and the other end of the catch mechanism abuts against or releases from the hub of the vehicle wheel under the driving of the rod mechanism.

13. The auxiliary wheel of claim 11, wherein, the first locking assembly further comprises an adaptation module which has a shape complementary with that of the through hole in the hub of the vehicle wheel and is embedded into the through hole when the auxiliary wheel is placed onto the hub of the vehicle wheel.

14. The auxiliary wheel of claim 13, wherein, one end of the catch mechanism is rotatablely connected with the adaptation module, and the other end of the catch mechanism abuts against or releases from the hub of the vehicle wheel under the driving of the locking member.

15. The auxiliary wheel of claim 1, wherein, the second locking assembly is a stake which is to be locked by the first locking assembly.

16. The auxiliary wheel of claim 15, wherein, an annular locking groove is formed on the stake, and the first locking assembly comprises a lock block retainer, at least one lock block, a self-locking cap, an elastic member and a cover;

the lock block retainer is fixed onto or formed integrally with the hub of the auxiliary wheel, the stake extends through the lock block retainer, at least one lock block receiving hole is formed in the longitudinal side wall of the lock block retainer, the number and position of the at least one lock block receiving hole correspond to the number of the at least one lock block and the position of the annular locking groove, respectively, the lock block is inserted into the lock block receiving hole, the self-locking cap surrounds the lock block retainer and has a tapered contact face that faces the lock block, the cover is fixedly attached to the lock block retainer, and the elastic member is used to apply an elastic force on the cap, to cause the tapered contact face of the cap to press and drive the lock block into the annular locking groove.

17. The auxiliary wheel of claim 16, wherein a contact face of the stake relative to the lock block forms an angle with respect to a contact face of the cap relative to the lock block, and the angle is less than or equal to the sum of a frictional angle between the lock block and the contact face of the stake and that between the lock block and the contact face of the cap.

18. The auxiliary wheel of claim 16, wherein, the first locking assembly further comprises a cam lever, which includes a cam and a handle attached to the cam, the cam is hinged with the self-locking cap and in contact with the cover, and is switchable between its locking position and unlocking position; when the cam lever is at its locking position, the tapered contact face of the cap presses and drives the lock block into the annular locking groove, and when the cam lever is at its unlocking position, the cap is lifted to cause the releasing of the lock block from the annular groove.

19. The auxiliary wheel of claim 1, wherein, the tire comprises an external tire and spikes that are attached to the external fire and protrude from the external surface of the external tire; the tire further comprises a spike seat attached to the external tire, and the spikes are formed on a substrate, which is slidable along a pole of the spike seat, with the pole extending through a through hole in the substrate.

\* \* \* \* \*